(12) United States Patent
Klein

(10) Patent No.: US 7,784,762 B2
(45) Date of Patent: Aug. 31, 2010

(54) WALL HANGING MOUNTING DEVICE

(75) Inventor: Don W. Klein, Cedarburg, WI (US)

(73) Assignee: Fermions, L.L.C., Cedarburg, WI (US)

( * ) Notice: Subject to any disclaimer, the term of this patent is extended or adjusted under 35 U.S.C. 154(b) by 1149 days.

(21) Appl. No.: 11/295,703

(22) Filed: Dec. 6, 2005

(65) Prior Publication Data

US 2007/0125928 A1 Jun. 7, 2007

(51) Int. Cl.
*F16M 13/00* (2006.01)
(52) U.S. Cl. ............... 248/544; 248/475.1; 227/31; 227/32; 33/666
(58) Field of Classification Search ........... 248/544, 248/475.1; 227/31, 32, 147, 156, 141, 153; 33/666, 613
See application file for complete search history.

(56) References Cited

U.S. PATENT DOCUMENTS

| | | | |
|---|---|---|---|
| 2,774,969 A * | 12/1956 | Samples | 227/147 |
| 3,166,757 A | 1/1965 | Downs, Jr. | |
| 3,530,591 A | 9/1970 | Moffitt | |
| 3,599,686 A | 8/1971 | Peebles | |
| 3,883,064 A | 5/1975 | Higers | |
| 4,037,632 A * | 7/1977 | Arena | 81/44 |
| 4,220,309 A | 9/1980 | Eisen et al. | |
| 4,228,982 A | 10/1980 | Sellera | |
| 4,241,510 A | 12/1980 | Radecki | |
| 4,249,297 A | 2/1981 | Waters | |
| 4,382,337 A | 5/1983 | Bendick | |
| 4,455,756 A | 6/1984 | Greene | |
| 4,461,418 A | 7/1984 | Schaefer | |
| 4,473,957 A | 10/1984 | Faulkner | |
| 4,559,690 A | 12/1985 | Asmus | |
| 4,637,583 A | 1/1987 | Babitz | |
| 4,804,161 A | 2/1989 | Wallo | |
| 4,821,992 A * | 4/1989 | Johnson | 248/493 |
| 4,860,937 A | 8/1989 | Arnold | |
| 4,874,123 A | 10/1989 | Mercer, II et al. | |
| 4,893,776 A | 1/1990 | Floyd | |
| 5,103,574 A | 4/1992 | Levy | |
| 5,129,154 A | 7/1992 | Aydelott | |
| 5,180,135 A | 1/1993 | Hindall | |
| 5,398,906 A | 3/1995 | Aydelott | |
| 5,520,318 A | 5/1996 | Sloop | |
| 5,867,917 A | 2/1999 | Karon | |
| 6,053,468 A | 4/2000 | Francis | |
| 6,185,831 B1 | 2/2001 | Pluciennik | |
| 6,245,177 B1 | 6/2001 | Luhmann | |
| 6,739,065 B2 * | 5/2004 | Hofmeister et al. | 33/613 |
| 7,159,329 B2 * | 1/2007 | Dolenz et al. | 33/666 |

OTHER PUBLICATIONS

Solve-It Marketing Co., Hangs-All, www.solve-it marketing.com/hangsall, Nov. 11, 2002.

* cited by examiner

*Primary Examiner*—Kimberly T Wood
(74) *Attorney, Agent, or Firm*—Rathe Patent & IP Law

(57) ABSTRACT

A wall hanging mounting device for use with at least one wall support and a wall hanging having a mounting portion includes a coupling unit configured to couple the at least one wall support to a wall while the wall support is in at least close proximity to the mounting portion of the wall hanging. The coupling unit includes a drive surface that moves in a plane or about an axis between the wall hanging and the wall.

19 Claims, 24 Drawing Sheets

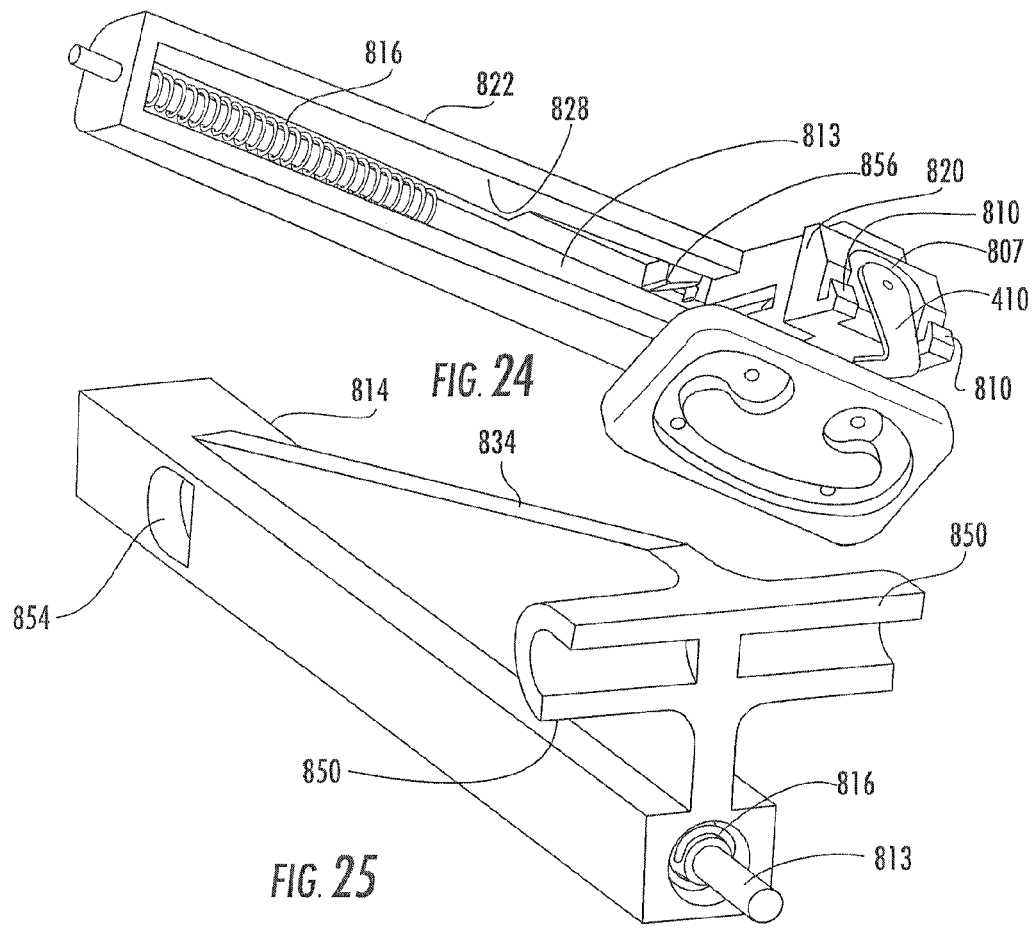
FIG. 24
FIG. 25
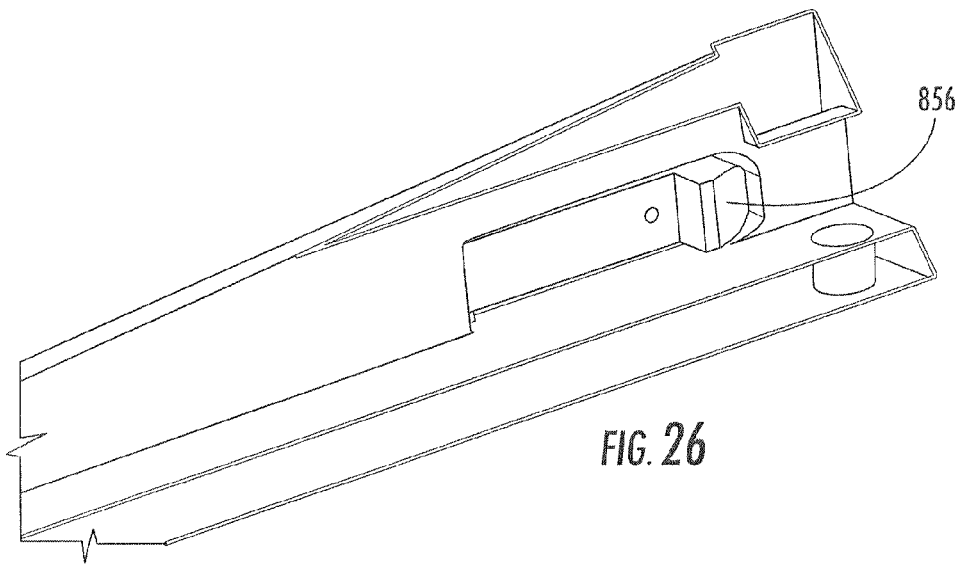
FIG. 26

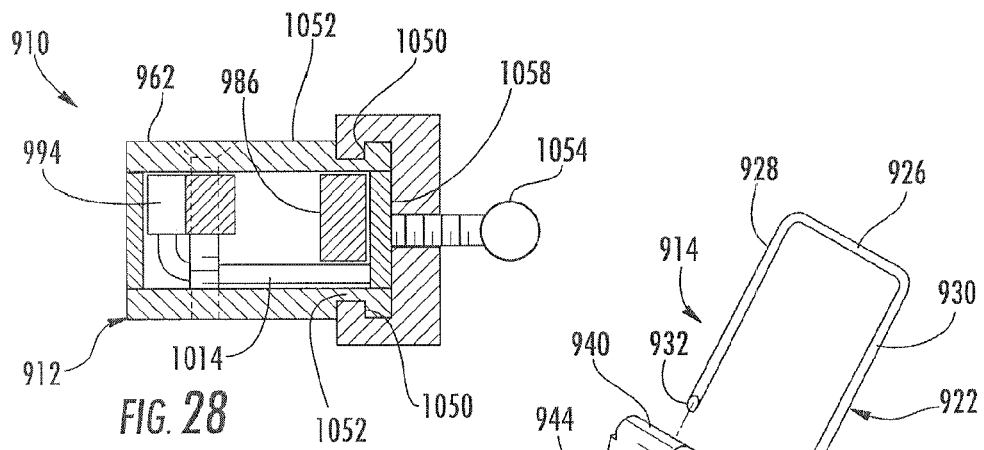
FIG. 28
FIG. 29
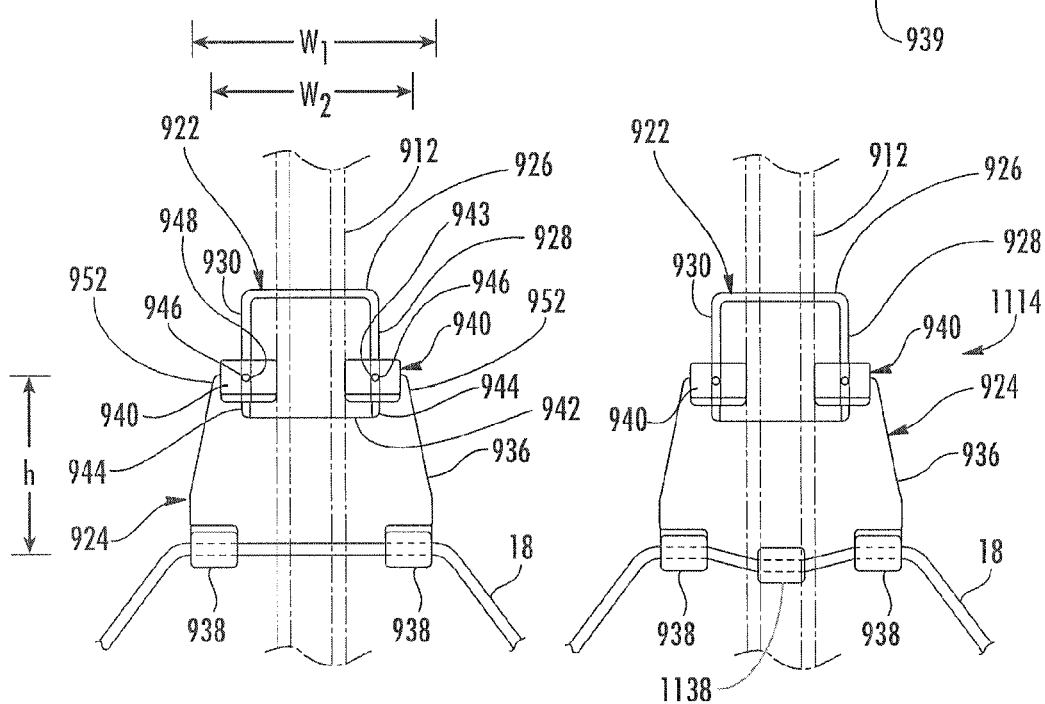
FIG. 30
FIG. 31

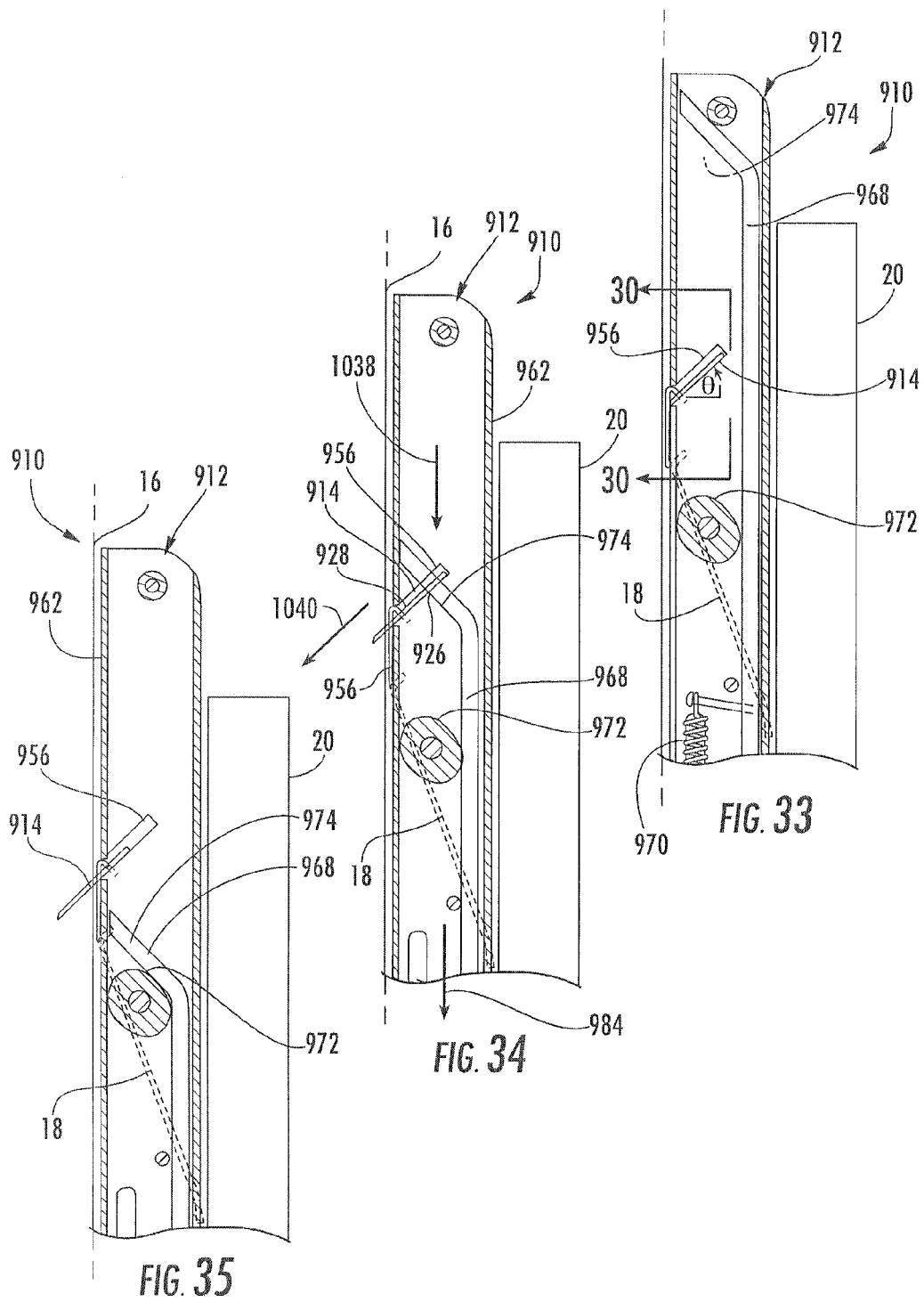

WALL HANGING MOUNTING DEVICE

The present application claims priority under 35 USC §120 from co-pending PCT application PCTUS/2004/017806 which was filed on Jun. 7, 2004, by Don W. Klein and entitled "Wall Hanging Mounting Device, which claimed priority under 35 U.S.C. §119(e) from co-pending U.S. provisional patent application Ser. No. 60/476,728, entitled WALL HANGING MOUNTING DEVICE WITH ANGLE DRIVE and co-pending U.S. provisional patent application Ser. No. 60/476,699, entitled WALL HANGING MOUNTING DEVICE, both filed on Jun. 6, 2003 by Don W. Klein, the full disclosures of which are hereby incorporated by reference.

FIELD OF THE INVENTION

The present invention generally relates to methods and mechanisms for mounting wall hangings to walls. In particular, the present invention relates to a method and device for coupling a wall support to a wall while the wall hanging is substantially located at its final hanging position along the wall.

BACKGROUND

Wall hangings, such as paintings, photographs, drawings, other framed or unframed works, wall mounted furniture or decorations such as curios, mirrors, candle holders and the like, and various wall mounted electronics, such as flat screen televisions, monitors and the like, come in a variety of shapes, sizes and configurations. Some wall hangings may be lifted and positioned along a vertical wall or a horizontal wall (i.e. ceiling) by a single person, while other wall hangings require multiple individuals to mount the wall hangings along a wall. Some wall hangings have mounting portions comprising wires from which a wall hanging is hung. Other wall hangings have mounting portions comprising mounting extensions through which nails or other impelling members may extend into the wall or comprising brackets configured to rest upon or otherwise engage one or more nails or other wall imbedded members.

Regardless of the wall hanging configuration, its mounting portion or the wall support used to couple the wall hanging to the wall, mounting the wall hanging to a wall is difficult, tedious and time consuming. A properly mounted wall hanging is generally appropriately spaced, both vertically and horizontally, with respect to the dimensions of the wall, the location of other wall hangings along the same wall, or the location of other objects within the room. Meeting these demands is not an easy task. The person or persons mounting the wall hanging generally must measure the wall hanging itself, measure the wall, and measure the relative distances between various objects along the wall in an attempt to identify the desired position for the wall hanging. Once this is determined, the person mounting the wall hanging must then identify where the wall supports (i.e., nails, hooks, activatable bonding members and the like) must be coupled to the wall. In addition, the relative locations of the mounting portions on the back of the wall hanging must be accounted for when attaching the wall supports to the wall. If multiple wall supports are required, the relative positioning of the wall supports themselves must be carefully identified to ensure that the wall hanging will be level once in place.

Once the wall supports are actually mounted to the wall, the person mounting the wall hanging can only hope that his or her calculations were correct. The final outcome cannot generally be determined until the wall supports are embedded or otherwise attached to the wall and until the wall hanging is actually mounted upon the wall supports. Mounting the wall hanging upon the wall supports may reveal that the calculations were erroneously made, resulting in a wall hanging that is not level or positioned along the wall in undesirable spacing relative to other wall hangings or objects in the room. Moreover, once the wall hanging is actually mounted along the wall, and the person can actually see the wall hanging in place along the wall, the person may change his or her mind about the desired position of the wall hanging. Unfortunately, repositioning the wall hanging requires that the entire process be repeated and results in unsightly holes or other mounting marks along the wall that either must be concealed by the wall hanging, or must be spackled and/or covered with paint or wallpaper.

BRIEF DESCRIPTION OF THE DRAWINGS

FIG. 24 is a bottom perspective view of a drive unit of the device of FIG. 21.

FIG. 25 is an end perspective view of the drive unit of FIG. 24.

FIG. 26 is a sectional view of a portion of the drive unit of FIG. 24.

FIG. 28 is a sectional view of the device of FIG. 27 taken along line 28-28 of FIG. 31.

FIG. 29 is an exploded top perspective view of a wall support of the device of FIG. 27.

FIG. 30 is a rear elevational view of the wall support of FIG. 28 coupled to a mounting portion and positioned adjacent to a coupling unit (shown in phantom) of the device of FIG. 27.

FIG. 31 is a rear elevational view of another embodiment of the wall support of FIG. 29 coupled to a mounting portion and positioned adjacent to a coupling unit (shown in phantom).

FIGS. 33, 34 and 35 are fragmentary views of the device of FIG. 32 illustrating the device in a loaded position, an impelling position and a discharged position, respectively.

DETAILED DESCRIPTION

Figure 1:
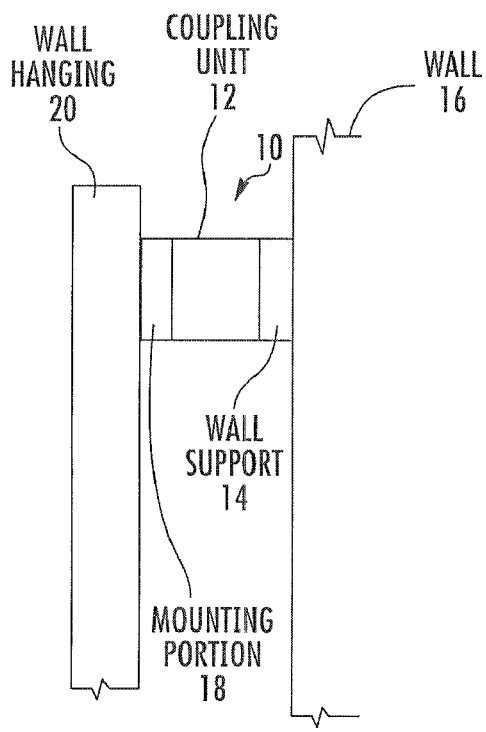
FIG. 1 is a fragmentary side elevational schematically illustrating a wall hanging mounting device coupling a wall hanging to a wall.

FIG. 1 is a schematic view of wall hanging mounting device 10. Mounting device 10 generally includes a coupling unit 12 configured to couple wall support 14 to wall 16 while the wall support 14 is in at least close proximity to the mounting portion 18 of wall hanging 20. Coupling unit 12 is configured to couple wall support 14 to wall 16 while coupling unit 12 is positioned between wall hanging 20 and wall 16.

Figure 2:
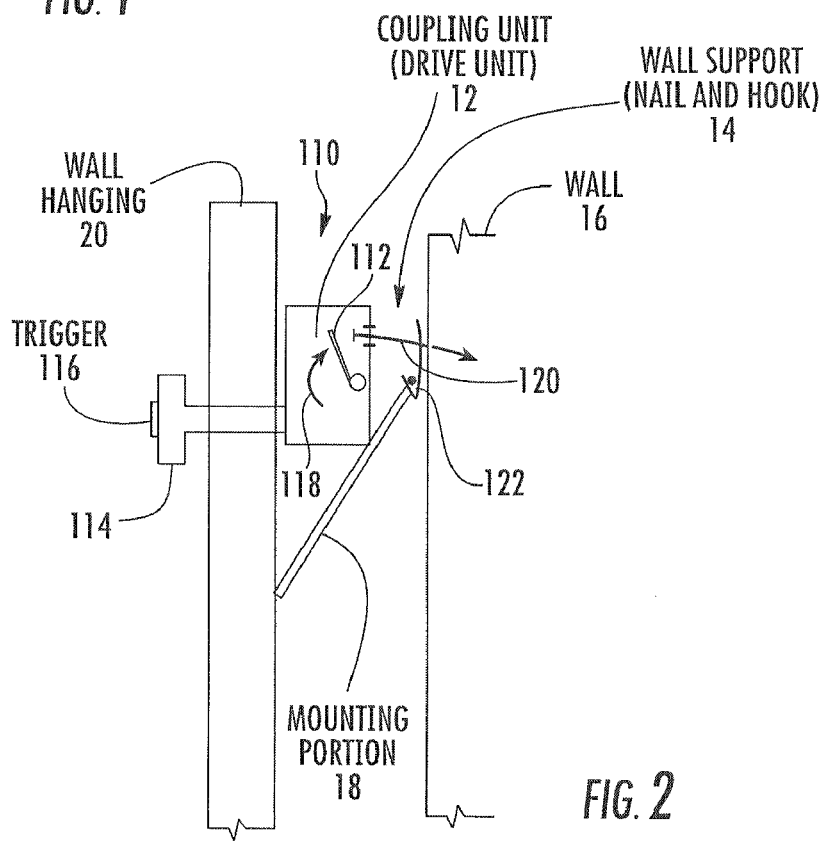
FIG. 2 is a side elevational view schematically illustrating a first embodiment of the wall hanging mounting device of FIG. 1.

FIG. 2 illustrates one embodiment of device 10 depicted in FIG. 1. FIG. 2 illustrates wall hanging mounting device 100 in which coupling unit 12 comprises a drive unit, in which wall support 14 comprises a nail and a hook and in which the mounting portion 18 of wall hanging 20 comprises a conventionally known wire. In this one embodiment, drive unit 12 includes drive member or hammer 112 which is spring loaded. Mounting device 110 further includes a handle 114 located on a front side of wall hanging 20 and an associated trigger 116. Upon actuation of trigger 116, hammer 112 is released so as to pivot in the direction shown by arrow 118 and so as to strike the head of a nail 120 partially and temporarily retained within drive unit 12. As a result, the nail 120 extending through hook 122 is impelled into the wall 16. This is accomplished while hook 122 is in engagement with the wire or mounting portion 18 of wall hanging 20. Once the nail 120 is impelled into wall 16, drive unit 12 and mounting device 110 are simply removed from behind wall hanging 20, leaving wall hanging 20 in substantially the same location along wall 16. In one preferred embodiment, two such hammers 112 are used to sequentially strike nail 120 to impel nail 120 into wall 16.

The embodiment shown in FIG. 2 is but one example of the broader concept depicted in FIG. 1. For example, wall support 14 mounted to the wall and configured to support the wall hanging 20 from wall 16 may have a variety of alternative configurations. Examples of alternative wall supports include nails alone, hooks and staples, hooks and screws, various mounting brackets or members configured to bond or adhere wall hanging 20 to wall 16 without necessarily requiring a member that is impelled into the wall (i.e. intermediate pad having an adhesive on both sides or an apoxy). In lieu of mounting portion 18 comprising a wire, mounting portion 18 may alternatively comprise a bracket affixed or integrally formed at the rear of wall hanging 20. Depending upon the structure of mounting portion 18 and wall support 14, drive unit 12 may also be varied. For example, in embodiments where wall support 14 comprises an apoxy, drive unit 12 may alternatively be configured to apply or activate apoxy or adhesive in place between wall 16 and wall hanging 20 while positioned between wall hanging 20 and wall 16.

Figure 3:
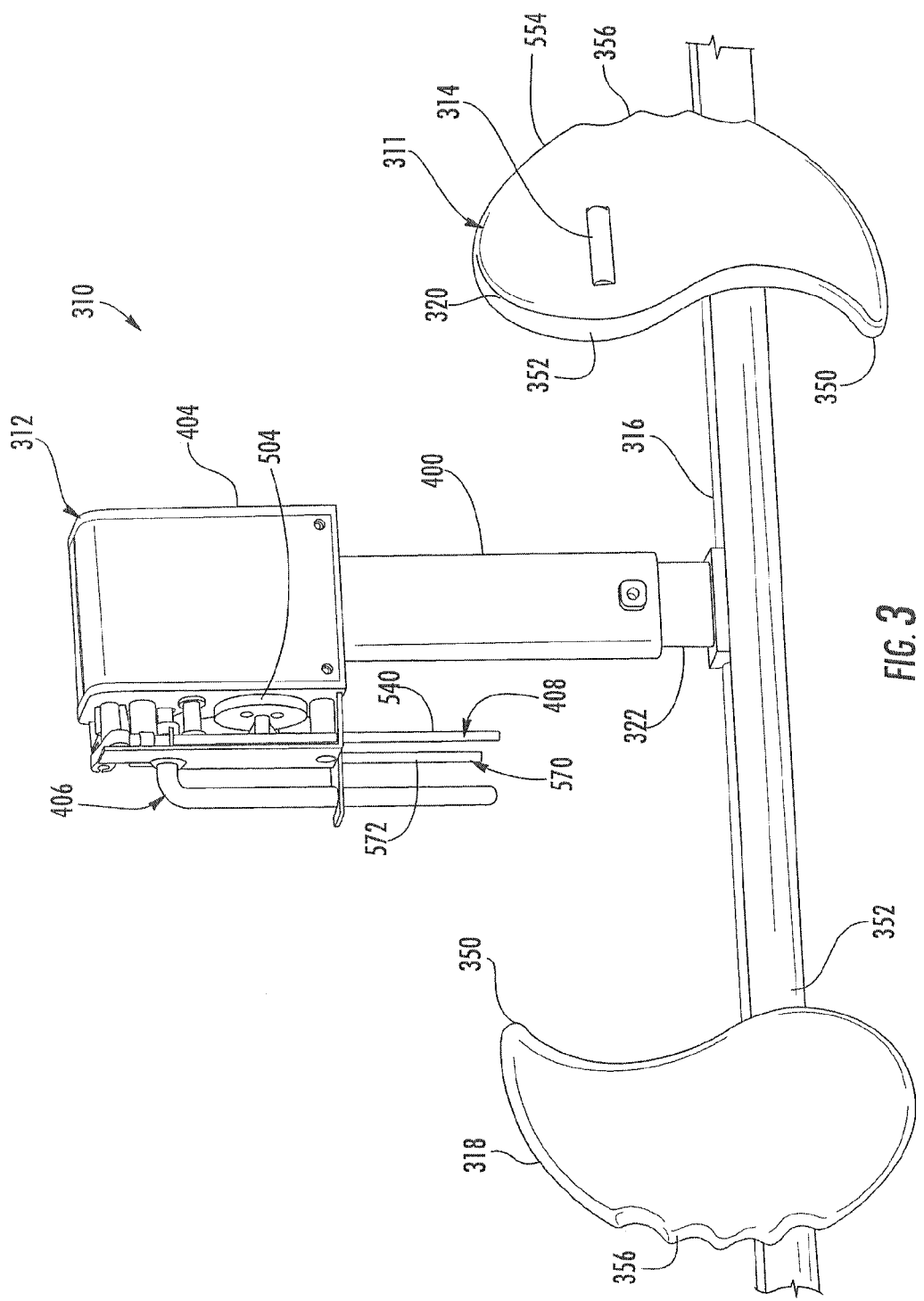
FIG. 3 is a perspective view of a second embodiment of the wall hanging mounting device of FIG. 1.

FIG. 3 is a perspective view of wall hanging mounting device 310, an alternative embodiment of wall hanging mounting device 10. For purposes of illustration, portions of wall hanging mounting device 310 are omitted. Wall hanging mounting device 310 generally includes unit support 311, coupling unit 312 and level indicator 314. Unit support 311 generally comprises a structure configured to support at least coupling unit 312 between wall 16 and wall hanging 20 (shown in FIGS. 1 and 2). In particular, unit support 311 comprises a structure configured to enable a person to maintain control of the positioning of coupling unit 312 by providing the person with at least one handle either in front of or outwardly beyond a perimeter of wall hanging 20. In the particular embodiment illustrated, unit support 311 is additionally adjustable to enable wall hanging mounting device 310 to be utilized with wall hangings 20 having different shapes and sizes. In the particular embodiment illustrated, unit support 311 generally includes arm 316, handles 318, 320 and post 322. Arm 316 generally comprises a structure configured to support one or more handles, such as handles 318 and 320 and further configured to support one or more posts such as post 322. In one particular embodiment, arm 316 is configured to movably support at least one of handles 318, 320 to enable the space in between handles 318 and 320 to be adjusted. In the embodiment shown, arm 316 is further configured to movably support post 322 to either enable post 322 to be moved relative to one or both of handles 318, 320 or to enable post 322 to be separated from arm 316. Similarly, arm 316 is also configured to enable handles 318 and 320 to be separated from arm 316 such that unit support 311 may be disassembled to enable compact storage and shipping and to provide support 311 with modularity for potential upgrades. Although less desirable, arm 316 may alternatively be configured to stationarily support one or more of handles 318, 320 or post 322.

Figure 4:
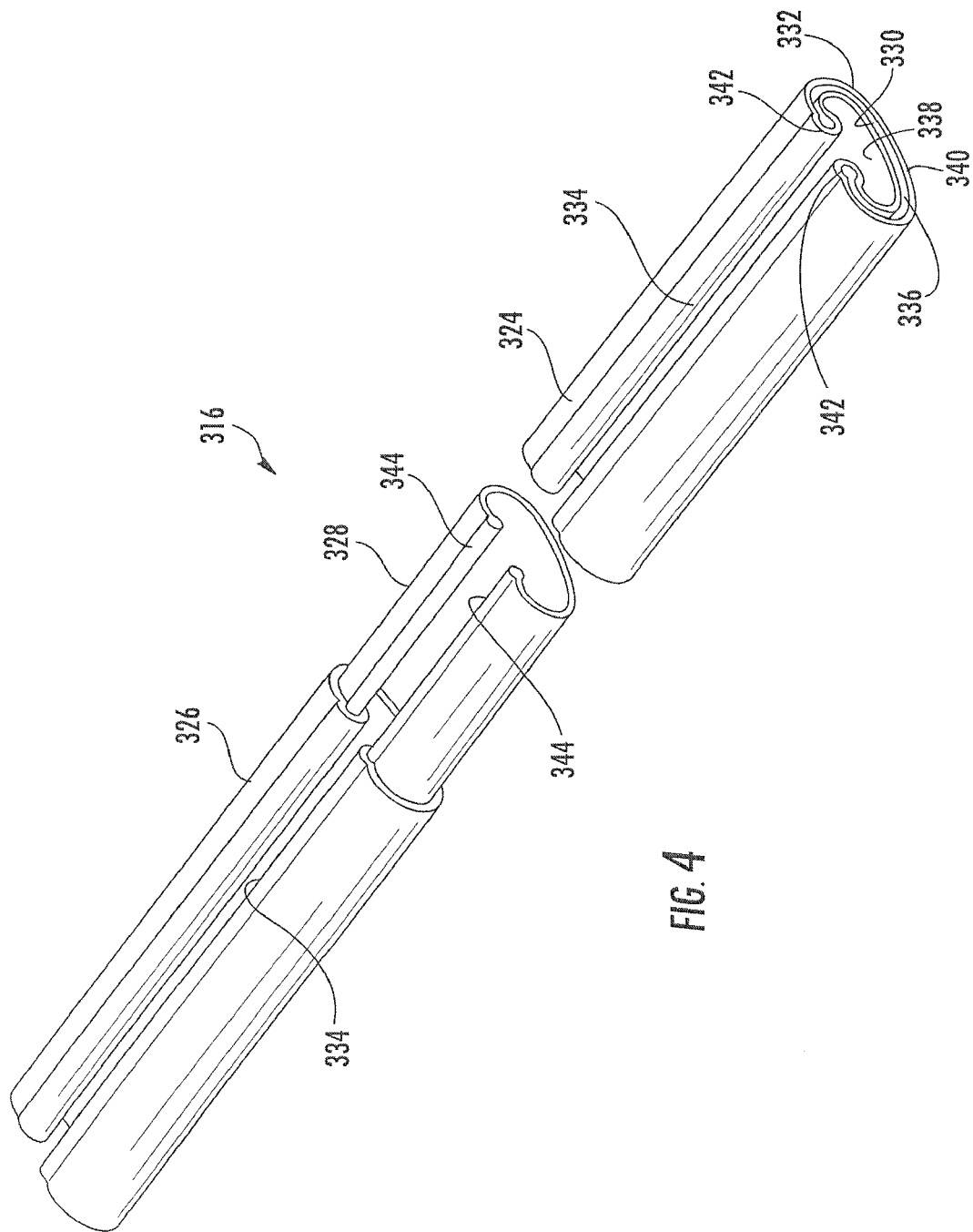
FIG. 4 is a fragmentary exploded perspective view of an arm of the device of FIG. 3.

FIG. 4 illustrates one particular embodiment of arm 316 in greater detail. As best shown by FIG. 4, arm 316, itself, has an adjustable length to accommodate differently sized wall hangings 20. In the embodiment shown, arm 316 includes a plurality of individual interlocking, but separable, sections or segments 324, 326 releasably coupled to one another by an interface or interlocking member 328. In the particular embodiment shown, sections 324 and 326 are each configured to form an interior elongate cavity or channel 330, an axial opening 332 communicating with channel 330, and an elongate slot 334 communicating with channel 330. As will be described in greater detail hereafter, axial opening 332 is configured to enable insertion of handles 318, 320 and post 322 into channel 330. Slot 334 enables handles 318, 320 and post 322 to slide along sections 324 and 326 while projecting from sections 324 and 326. In one particular embodiment, sections 324 and 326 preferably have a uniform cross section along their length, enabling sections 324 and 326 to be extruded to reduce manufacturing costs. Although sections 324 and 326 are illustrated as being generally C-shaped for reasons of strength as well as aesthetics, sections 324 and 326 may alternatively have various other cross sectional shapes.

Connector 328 releasably interconnects sections 324 and 326 to enable arm 316 to have an adjustable length. In the particular embodiment illustrated, connector 328 comprises a separate element releasably attachable to each of sections 324 and 326. In alternative embodiments, connector 328 may be coupled to one of sections 324 and 326 in other fashions. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. For example, in one embodiment, connector 328 may be integrally formed as part of a single unitary body with one of sections 324 and 326. In another alternative embodiment, connector 328 may be permanently affixed to one of sections 324 and 326.

As best shown by FIG. 4, connector 328 joins sections 324 and 326 by being simultaneously received within at least a portion of sections 324 and 326. In the embodiment shown, each of sections 324 and 326 includes an intermediate channel 336 which is formed between an internal wall 338 and an external wall 340 of each of sections 324, 326. When assembled, connector 328 extends within intermediate channel 336 to join sections 324 and 326 without projecting into or otherwise interfering with movement of any components within channel 338.

As also shown by FIG. 4, intermediate channel 336 terminates at a pair of opposing elongate cylindrical channel portions 342 which receive corresponding cylindrical portions 344 of connector 328. This structure provides an increased mass of material along slot 334 to increase the structural rigidity and strength along slot 334. Although less desirable, channel portion 342 as well as connector portion 344 may have other shapes or configurations or may be omitted.

FIG. 4 illustrates but one preferred example or embodiment of arm 316 and of potential configurations of sections 324, 326 and connector 328. A multitude of other configurations are also contemplated. For example, although intermediate channel 336 is illustrated as preferably extending along the entire axial length of sections 324 and 326, intermediate channel 336 may alternatively be formed only along axial end portions of sections 324 and 326. Although connector 328 is illustrated as being received within intermediate channel 336 during connection of sections 324 and 326, connector 328 may alternatively be configured to extend along the exterior of sections 324 and 326 when joining such sections. In such an alternative embodiment, connector 328 may simply wrap about the exterior wall 340 of sections 324 and 326 to bridge such sections or may be received within an alternatively configured slot of channel formed along the exterior of wall 340. In still other embodiments, connector 328 may be configured to receive a tongue or projection extending along exterior wall 340 of sections 324 and 326. In such alternative connection structures, interior wall 338 may be omitted. Although connector 328 is generally illustrated as comprising a single member, connector 328 may alternatively comprise a plurality of members which are coupled to one or both of sections 324 and 326 and which releasably interconnect with one another to join sections 324 and 326. For example, in lieu of comprising a single member which is slidably received within each of sections 324 and 326, connector 328 may alternatively comprise two members which are received within sections 324 and 326 and which interlock with one another. In an alternative embodiment, one or both of the two connectors may be integrally formed as part of a single unitary body with or permanently fastened to one of sections 324 and 326. In still another alternative embodiment, axial end portions of sections 324 and 326 may themselves be configured to serve as connectors to join adjacent sections 324 and 326. Although connector 328 enables sections 324 and 326 to be joined to one another without the need for additional tools, connector 328 or sections 324 and 326 may alternatively be configured to require tools for assembly.

In use, a person simply adds as many sections 324 and 326 together to provide arm 316 with the necessary length. In such an embodiment, sections 324 and 326 may have the same length or may have different lengths. Should a person need a longer arm to accommodate a larger wall hanging, the person can simply acquire an additional section.

Although arm 316 is illustrated as being adjustable with the addition or subtraction of sections, arm 316 may alternatively be configured to be adjustable in other manners. For example, arm 316 may alternatively include a plurality of sections which are telescopically received within one another to enable adjustment of the length of arm 316. Furthermore, although arm 316 is illustrated as providing an interior channel 338 and slot 334 for slidably receiving a corresponding portion of one or more of handles 318, 320 and post 322, arm 316 may alternatively be configured to movably support one or more of handles 318, 320 and post 322 in alternative fashions. For example, arm 316 (and possibly sections 324 and 326) may alternatively include a tongue or projection which is received within an elongate slot of channel provided in one or more of handles 318, 320 or post 322. Although less desirable, one or more of handles 318, 320 or post 322 may be permanently coupled to arm 316. For example, in alternative embodiments, handles 318, 320 may be integrally formed as part of a single unitary body with arm 316. For example, in an embodiment wherein individual sections are employed, one section may include handle 318, another section may include handle 320 and yet a third section may include post 322. Furthermore, in lieu of being movable along the length of arm 316, handles 318, 320 or post 322 may alternatively be configured to releasably mount at any one of a variety of positions along arm 316. For example, one or more of handles 318, 320 or post 322 may clamp or snap about arm 316 in various locations along arm 316 or may include interengaging detent and detent engaging members.

FIGS. 3 and 5-7 illustrate handles 318 and 320. As best shown by FIG. 3, handles 318 are generally configured to cooperate with one another so as to be spaced apart from one another and so as to engage or contact opposite transverse sides of wall hanging 20. Although wall hanging 20 will generally be supported by means of its mounting portion 18 hanging from a wall support 14 which itself is supported by coupling unit 312 and ultimately by handles 318 and 320, handles 318 and 320 stabilize wall hanging 20 to prevent undesirable movement or swinging of wall hanging 20. Although less desirable, handles 318 and 320 may alternatively be located or configured so as to not engage wall hanging 20. In the particular embodiment illustrated, handles 318 and 320 each generally include contact points 350, 352 which are spaced and distinct from one another. Portions between contact points 350 and 352 on each handle 318 and 320 do not come into contact with sides of a wall hanging 20. As a result, these distinct contact points 350 and 352 enable handles 318 and 320 to securely grip or engage transverse sides of wall hanging 20 even when the transverse sides of wall hanging 20 are irregular in shape and are not generally linear. The exact shape and location of contact points 350 and 352 relative to one another may vary.

Figure 5:
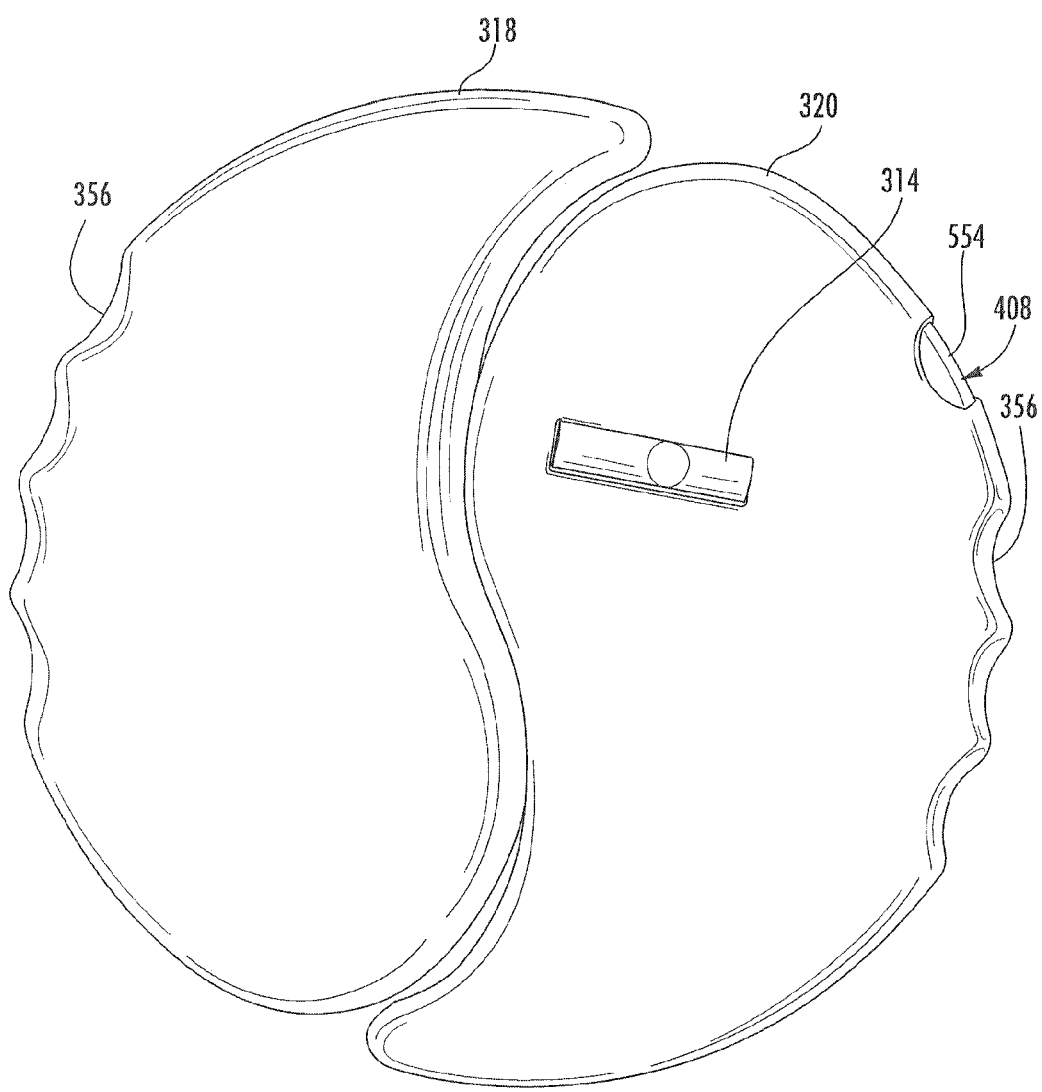
FIG. 5 is a top perspective view of handles of the device of FIG. 3.

As best shown by FIG. 5 which illustrates handles 318 and 320 generally move into a side-by-side adjacent position (such as when device 310 is being shipped or displayed), handles 318 and 320 are substantially identical to one another in shape to facilitate easier manufacturing. Handle 320 is substantially identical to handle 318 in all aspects except that handle 320 additionally houses and supports a portion of a trigger mechanism 408 (described hereafter with respect to coupling unit 312) and leveler 314. As further shown by FIG. 5, each of handles 318 and 320 include finger grips 356 which identify to a user of device 310 where handles 318 and 320 should be gripped to facilitate improved gripping. Various other finger grip mechanisms or surfaces (elastic or compressible) may be provided on handles 318 and 320. Although less desirable, such handle grips may be omitted. Furthermore, as best shown by FIG. 5, handles 318 and 320, when positioned adjacent to one another, form a ying-yang design. While this general configuration is purely for aesthetic design reasons, handles 318 and 320 may have a variety of alternative shapes and configurations.

Figure 6:
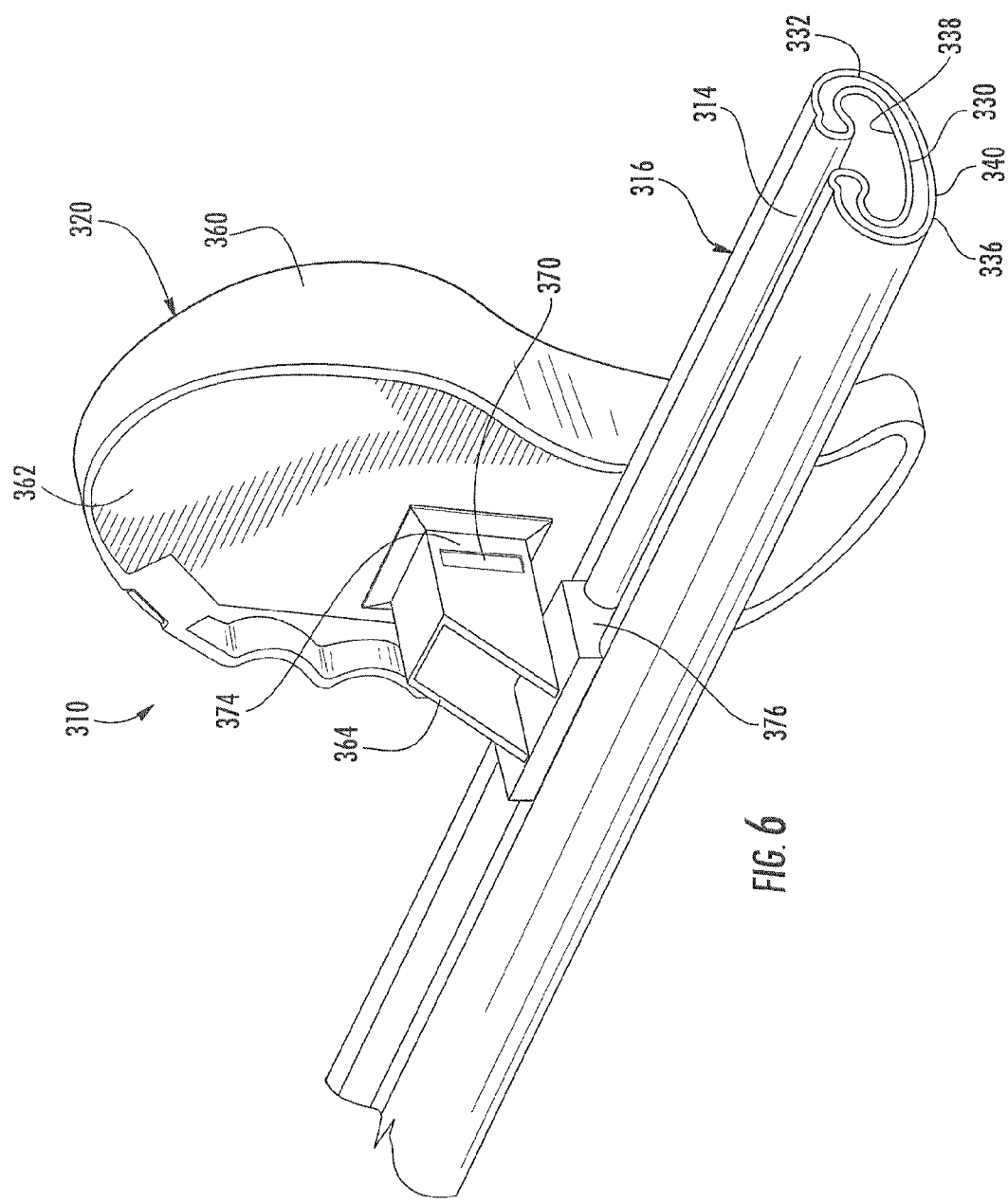
FIG. 6 is a fragmentary perspective view of one of the handles of FIG. 5 coupled to the arm of FIG. 4.
Figure 7:
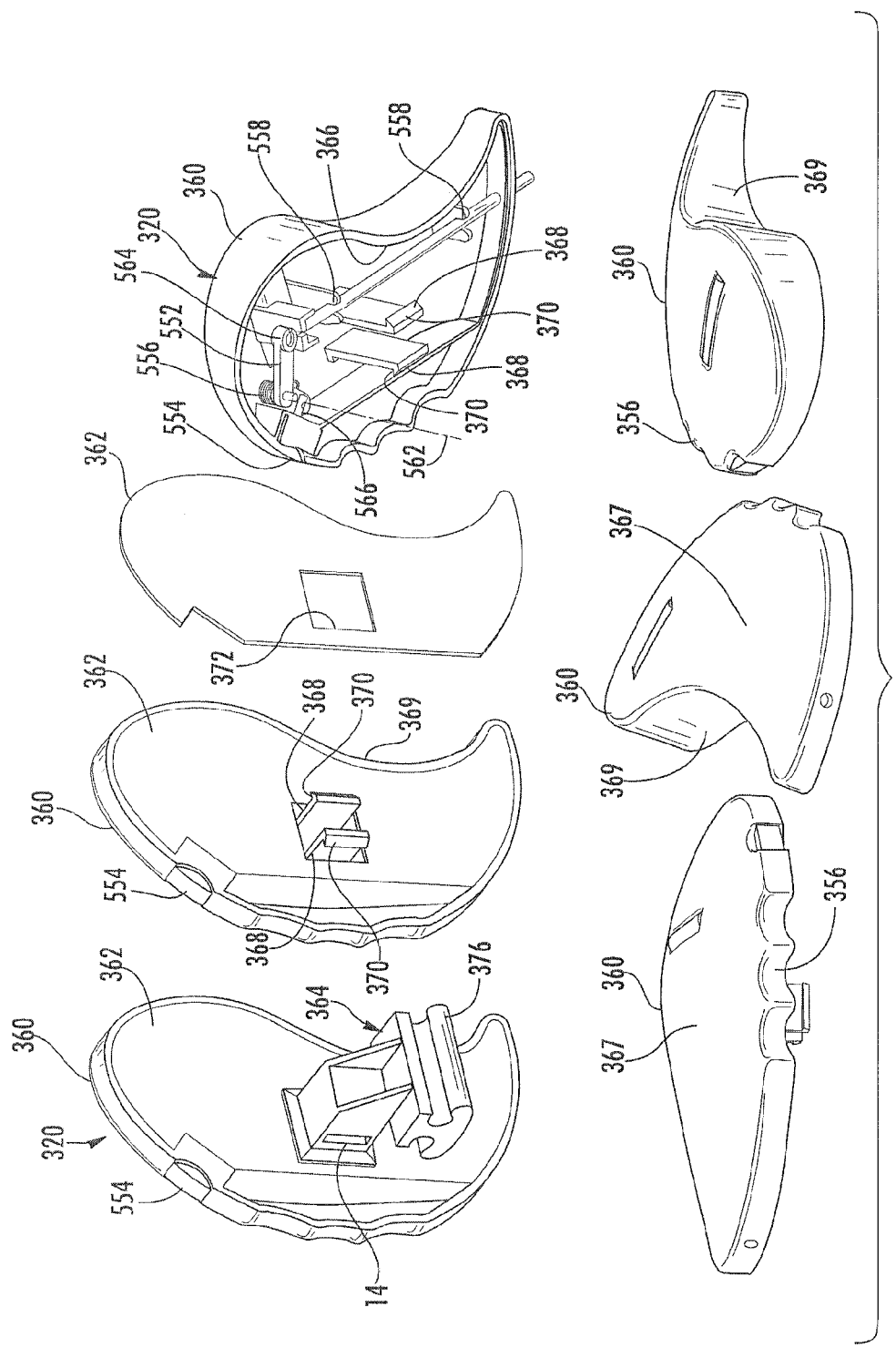
FIGS. 7A-7D are perspective views illustrating assembly of a handle and trigger mechanism of the device of FIG. 3.
FIGS. 7E, 7F and 7G are perspective views of the handle of FIG. 3.
Figure 8:
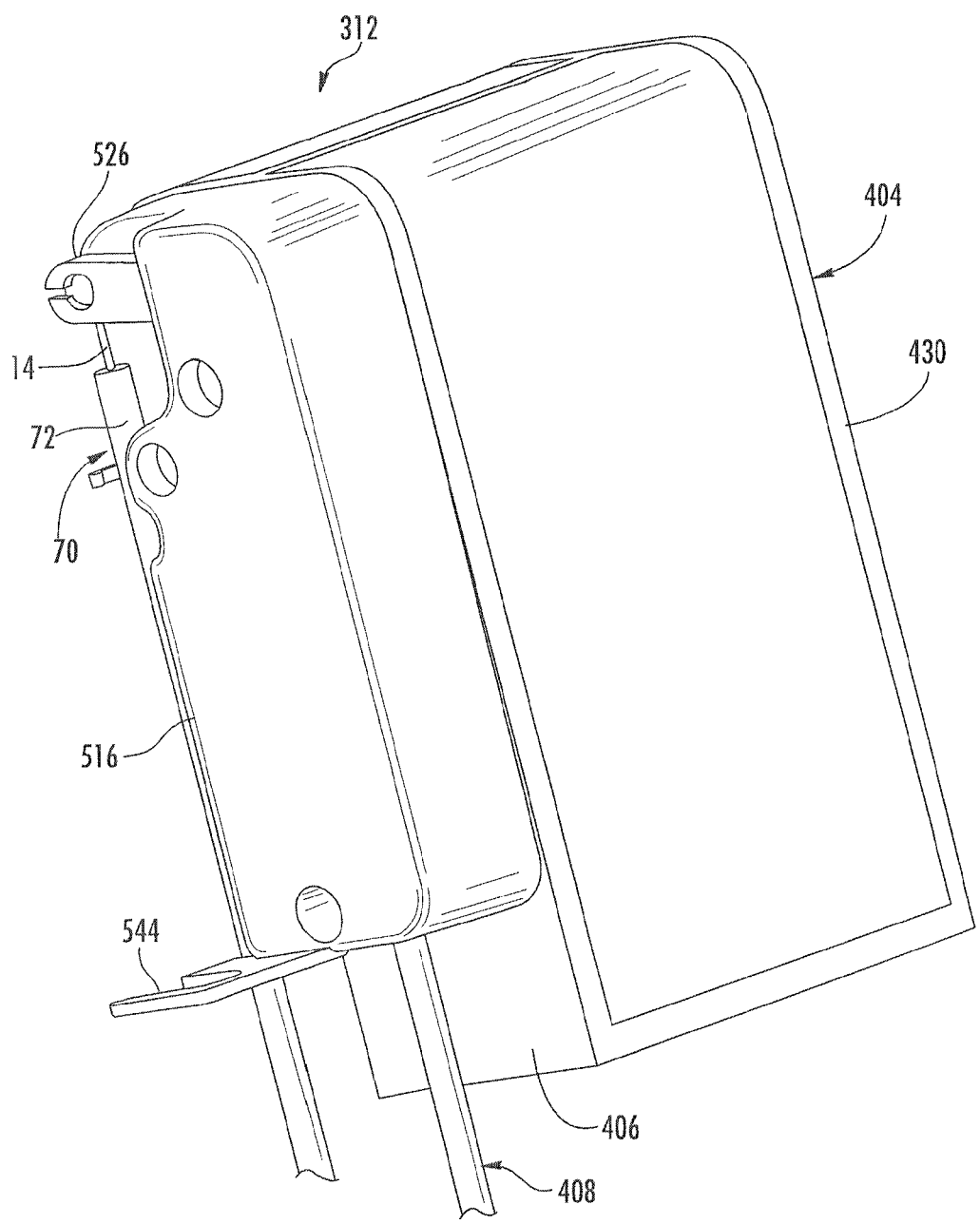
FIG. 8 is a perspective view of a coupling unit of the device of FIG. 3.

FIGS. 6 and 7 illustrate handle 320 in greater detail. FIG. 6 illustrates handle 320 coupled to arm 316. FIG. 7 illustrates various views and assembly or subassembly combinations of handle 320. As best shown by FIG. 7, handle 320 generally includes a front cover 360 and rear cover 362 and an arm coupling portion 364. Front cover 360 forms an interior cavity 366 which houses and supports portions of trigger mechanism 408. In addition, front cover 360 provides those surfaces which are gripped by an individual utilizing wall hanging mounting device 310. As best shown by FIG. 7, front cover 360 has a bulbed or rounded surface 367 which is configured to project into a palm of a user's hand. Cover 360 additionally includes an opening, notch or recessed area 369 generally opposite finger grips 356. As a result, handle 320 has a reduced width between opening 369 and finger grips 356 and the round or bulbous surface 367 of handle 320 provide comfortable ergonomic gripping of handle 320. In the particular embodiment illustrated, front cover 360 additionally includes coupling portions 368 configured to couple rear cover 362 to front cover 360 and also configured to couple coupling member 364 to front cover 360. In the particular embodiment illustrated, coupling portion 368 comprises projections integrally formed as part of a single unitary body with cover 360. The projections include hook portions 370 which are configured to engage coupling member 364.

Rear cover 362 generally comprises a plate having an outer shape configured to mate with front cover 360 so as to conceal interior cavity 366 and so as to conceal components of trigger mechanism 408. Rear cover 362 includes an aperture 372 through which coupling portions 368 project into engagement with coupling member 364. As a result, rear cover 362 is sandwiched between front cover 360 and coupling member 364.

Coupling member 364 generally comprises one or more structures coupled to the remainder of handle 320 and configured to couple handle 320 to arm 316. In the particular embodiment illustrated, coupling member 364 includes an internal cavity having two side apertures 374 to opposite side apertures 374 (only one of which is shown) and an inverted T-shaped tongue portion 376. Once front cover 360, rear cover 362 and mounting member 364 are assembled, coupling portion 368 projects through aperture 372 into the interior cavity of coupling member 364, wherein hook portions 370 resiliently flex inwardly until being snapped into place through side openings 374. As a result, handle 320 may be quickly and easily assembled with minimal parts and without tools.

As best shown by FIG. 6, tongue portion 376 is slidably received within channel 338 of arm 316 and projects through slot 334 for movement along arm 316. Although tongue portion 376 is illustrated as an inverted T-shaped tongue, tongue portion 376 may have a variety of other alternative configurations configured to slidably mount handle 320 to arm 316. As noted above, tongue portion 376 may be omitted or may be substantially altered depending upon whether handle 320 is movably coupled to arm 316, the means by which arm 320 is to be coupled to arm 316 and the configuration of arm 316 itself.

Furthermore, although handle 320 is illustrated as having a front cover 360 which provides a recess that substantially receives trigger mechanism 408, various other arrangements may be employed. For example, both front cover 360 and rear cover 362 may provide partial cavities that together enclose portions of the trigger mechanism 408. In still other embodiments, rear cover 362 may itself provide a substantial interior recess or cavity housing trigger mechanism 408. Furthermore, in still other alternative embodiments, front cover 360 and rear cover 362 may be secured to one another and to coupling member 364 independent of one another and by various other conventionally known or future developed fasteners, welds, adhesives, or mechanical snap arrangements.

Handle 318 is substantially identical to handle 320 in all respects except that handle 318 does not house or enclose portions of a trigger mechanism 408. Likewise, handle 318 does not house or support a leveler 314.

Post 322 generally comprises one or more structures supporting coupling unit 312 relative to arm 316. In the particular embodiment shown, post 322 movably couples coupling unit 312 relative to arm 316. This is generally achieved by providing post 322 with a lower end which includes a tongue portion substantially identical to tongue portion 376 of handle 320. As a result, post 322 slides within channel 332 of arm 316. As noted above, post 322 may be coupled to arm 316 in a variety of other fashions.

In addition to FIG. 3, FIGS. 8-19 illustrate coupling unit 312. Each of the figures illustrating coupling unit 312 may omit portions of coupling unit 312 for ease of illustration. Coupling unit 312 generally includes arm coupling portion 400, wall support holder 402, drive mechanism 404, loading mechanism 406 and trigger mechanism 408. As best shown by FIG. 3, arm coupling portion 400 generally comprises a structure coupled to the remainder of coupling unit 312 and configured to couple coupling unit 312 to post 322. In the particular embodiment illustrated, arm coupling portion 400 generally comprises an elongate tube slidably receiving post 322 to enable coupling unit 312 to slide vertically along post 322 to adjust a height of coupling unit 312 relative to arm 316 to accommodate different sized wall hangings 20. In one particular embodiment, post 322 is provided with a plurality of vertically spaced detents while coupling portion 400 is provided with a spring-biased detent-engaging member which is resiliently biased towards the detents and which is manually actuatable away from the detents. In one embodiment, a resiliently biased polymeric flap having a protuberance or tooth is integrally formed as part of coupling portion 400 and which is located so as to project into one of a plurality of corresponding notches or cutouts formed vertically along post 322. In this manner, the positioning of coupling portion 400 relative to post 322 may be adjusted. In another embodiment, coupling portion 400 is provided with a clamping mechanism which causes the coupling portion to frictionally engage post 322 or which itself engages post 322. For example, coupling portion 400 may be provided with a threaded bolt or screw which presses directly against post 322 or which presses a portion of coupling portion 400 into frictional contact with post 322.

In alternative embodiments, various other means may be employed to movably support and releasably retain coupling portion 400 relative to post 322. For example, in lieu of utilizing integrally formed resilient material, independent springs may be employed such as leaf springs, coil springs and the like to resiliently bias the detent-engaging member. In alternative embodiments, coupling portion 400 may be provided with a detent while post 322 is provided with a plurality of vertically spaced detents while post 322 is provided with one or more resiliently biased detent-engaging members. In lieu of coupling portion 400 telescopically receiving post 322, this arrangement may be reversed. In addition, coupling portion 400 of post 322 may alternatively be configured to only partially receive or partially project into a portion of the other of coupling portion 400 and post 322. Although less desirable, coupling portion 400 may alternatively be configured to permanently secure coupling unit 312 to post 322 or to require the use of fasteners and tools for such coupling of the two members.

In lieu of being telescopically adjustable relative to one another, coupling portion 400 and post 322 may alternatively be configured to permit the intermediate attachment or coupling of one or more additional sections or segments to vary the vertical positioning of drive mechanism 404 relative to arm 316. In this manner, a person can simply detach coupling portion 400 from post 322 and insert an intermediate extender section which is removably coupled to the lower end of coupling portion 400 and which is removably or separately attached to the upper end of post 322.

Figure 9:
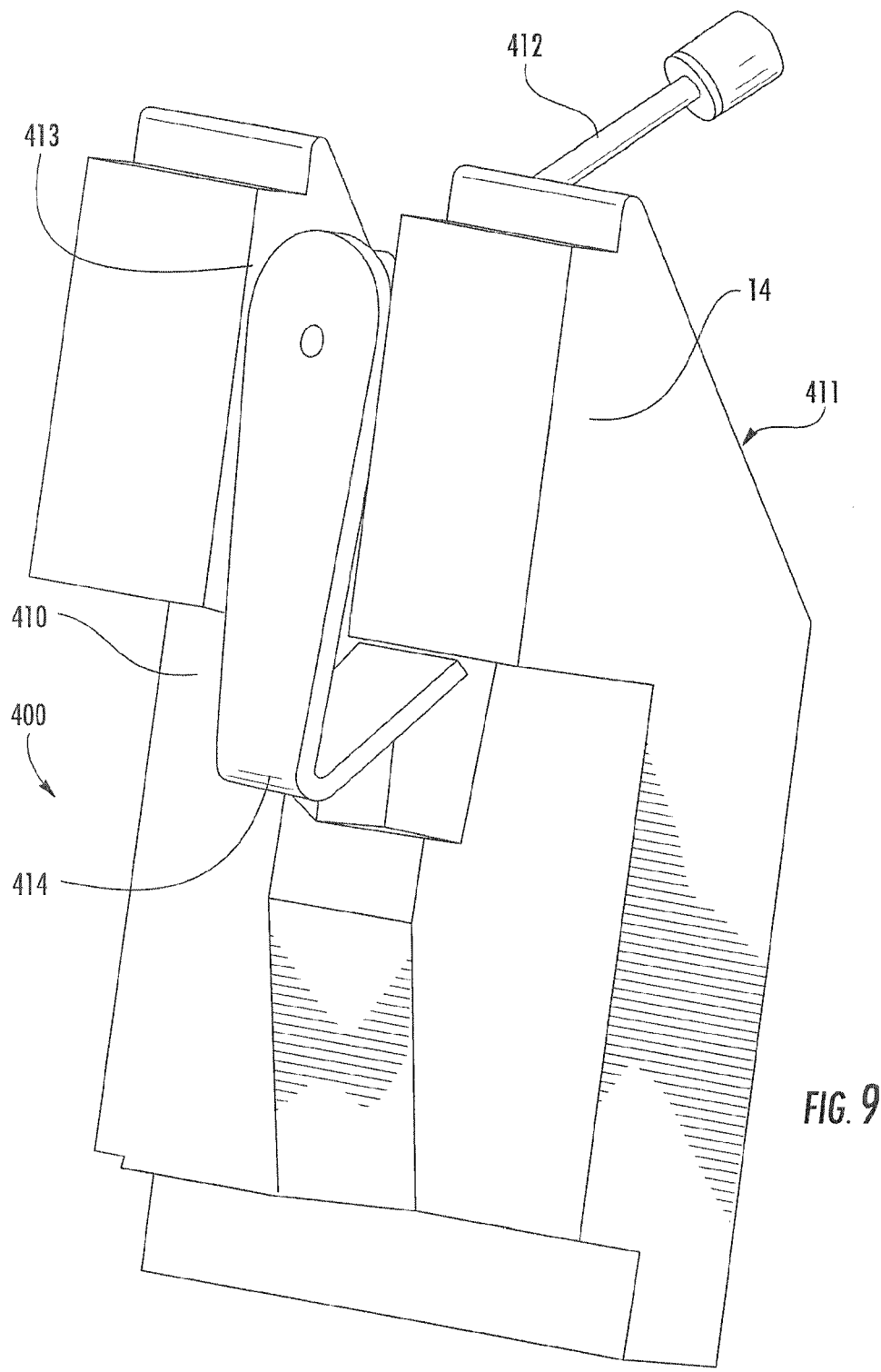
FIG. 9 is a rear perspective view of a wall support holder of the coupling unit of FIG. 8.
Figure 10:
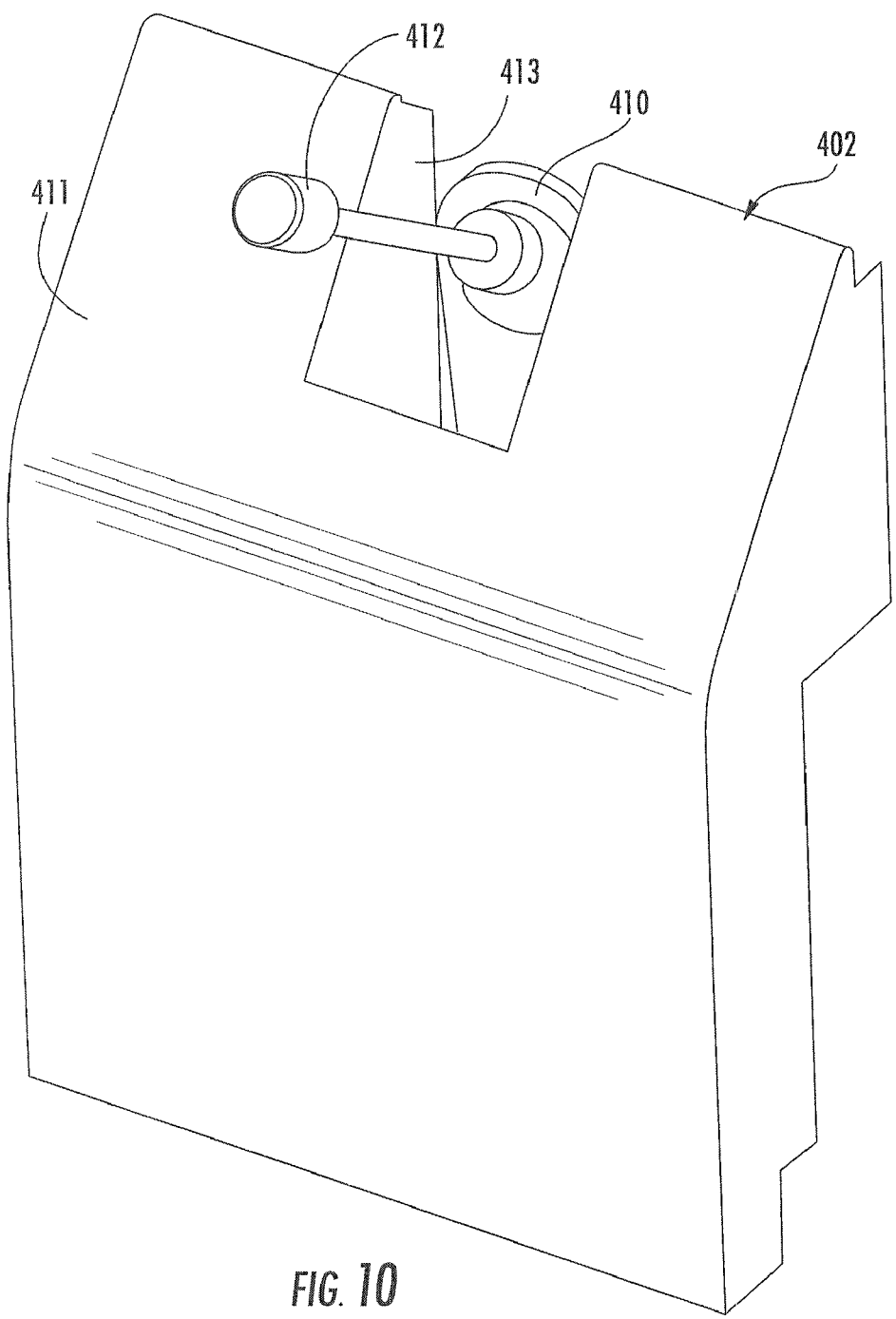
FIG. 10 is a front perspective view of the wall support holder of FIG. 9.

FIGS. 9 and 10 best illustrate wall support holder 402. As best shown by FIG. 9, wall support holder 402 generally comprises a structure configured to hold or temporarily retain a wall support 14 in place as drive mechanism 404 impels or otherwise couples the wall support 14 to wall 16. In the particular embodiment illustrated, holder 402 is configured to hold a wall support 14 consisting of a hook 410 and an impeller 412 (shown as a nail). As best shown by FIGS. 9 and 10, wall support holder 402 generally includes a body 411, an alignment channel 413 and a support surface 414. Channel 413 is generally formed in a housing or other structure of coupling unit 312 and is sized or configured to receive an upper portion of hook 410 so as to align the lower portion of hook 410 upon surface 414 and so as to permit impeller 412 to communicate with the internal components of drive mechanism 404 while remaining in at least close proximity with hook 410.

Support surface 414 extends below channel 413 and is configured to engage a lower portion of hook 410. In the embodiment shown, surface 414 is downwardly sloped towards a front of device 310 (i.e., away from wall 16 or towards wall hanging 20). FIG. 10 illustrates a front side of the housing or other structure of coupling unit 312 which provides channel 413. In the particular embodiment illustrated, the housing providing channel 413 and surface 414 simultaneously encloses part of the housing or enclosure of drive mechanism 404. Although not illustrated, various other configurations of wall support holder 402 may be employed depending upon the configuration, size and type of wall support 14 being employed.

Figure 11:
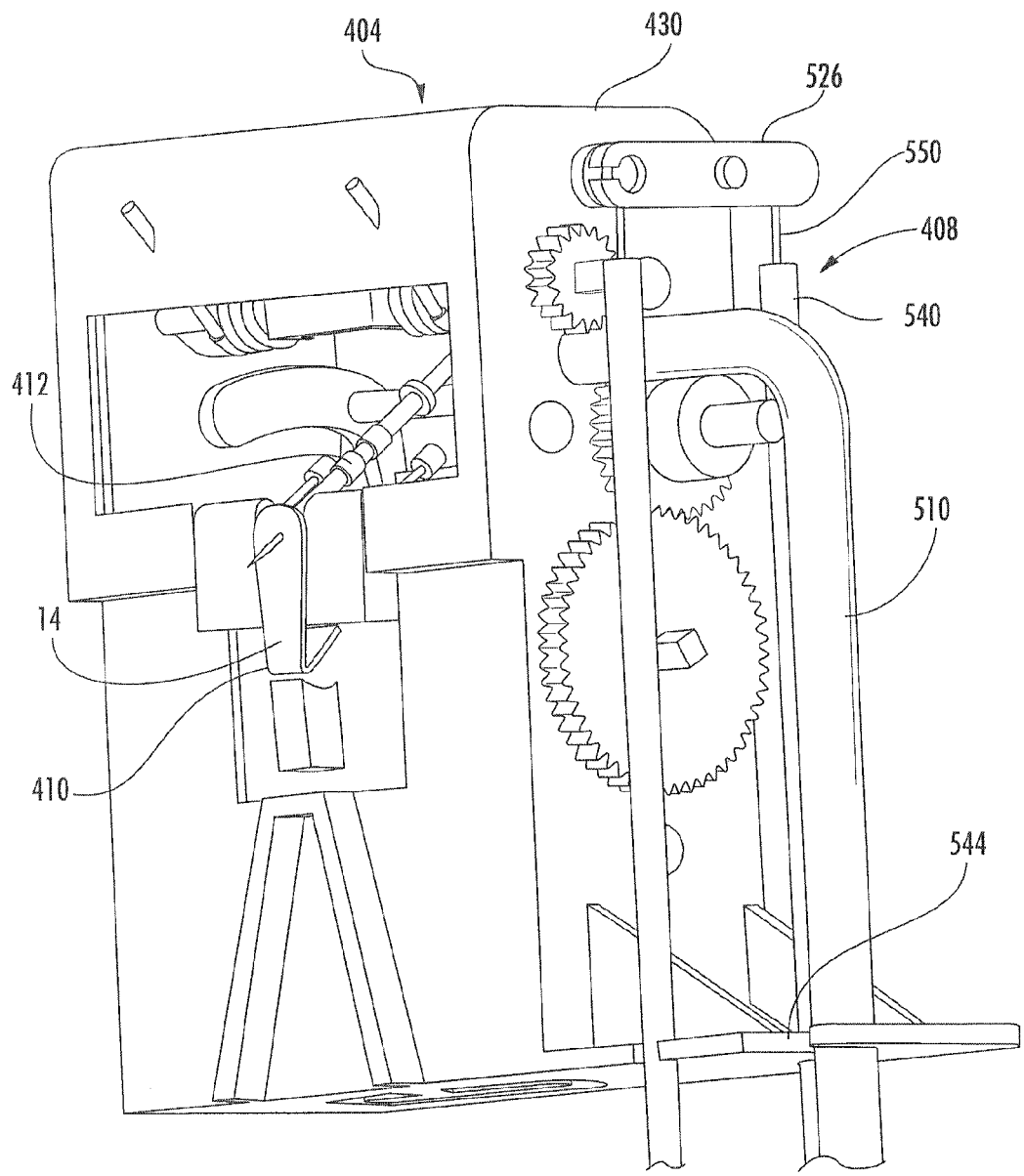
FIG. 11 is a rear perspective view of the coupling unit of FIG. 8 with portions removed for purposes of illustration.
Figure 12:
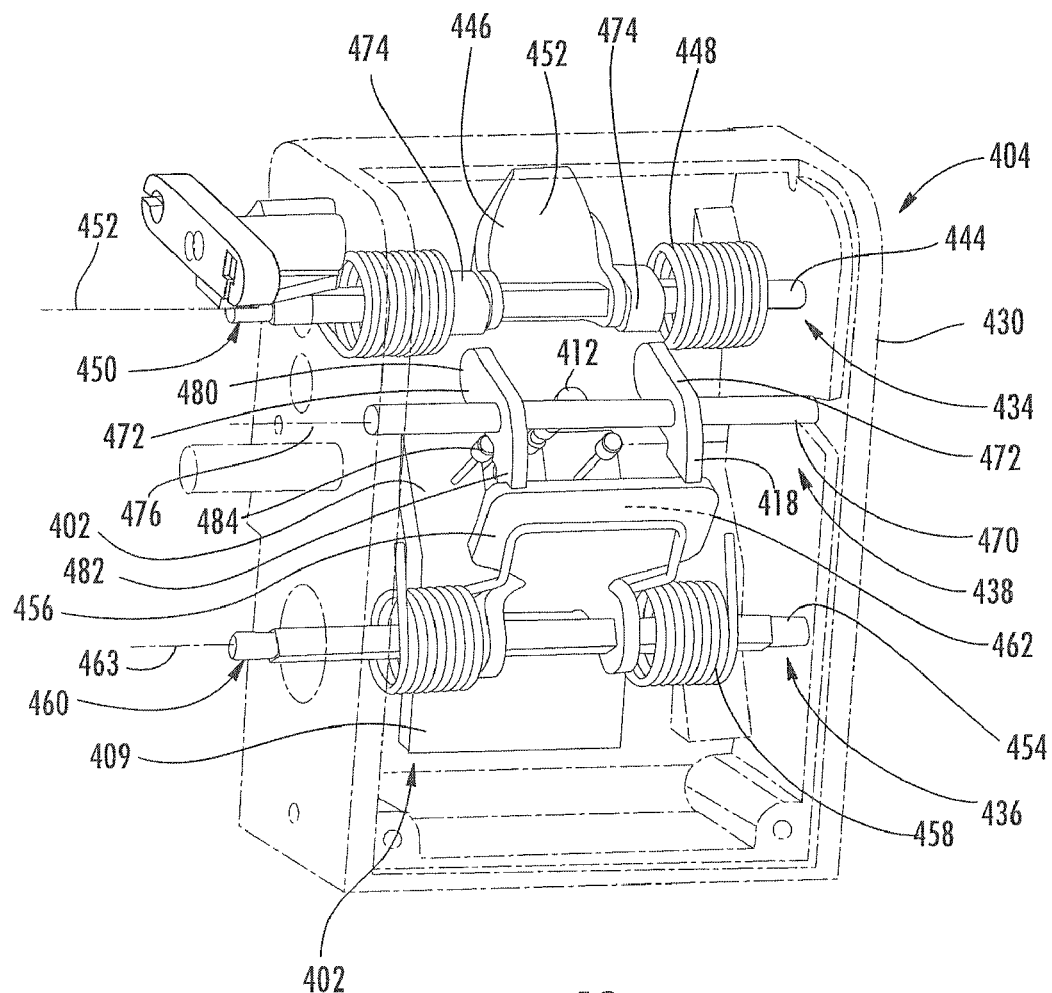
FIG. 12 is a front perspective view of the coupling unit of FIG. 8 with portions shown with hidden lines for purposes of illustration.

As best shown by FIG. 11, body 411 of wall support holder 402 is configured to be releasably coupled to drive mechanism 404. In the particular embodiment illustrated, body 411 is configured to snap into place within a channel or opening formed along a back surface of drive mechanism 404. In alternative embodiments, body 411 may be releasably or detachably secured to a back surface of drive mechanism 404 by various other conventionally known or future developed attachment or coupling arrangements such as fasteners, releasable adhesives and the like. Because body 411 and wall support holder 402 are releasably coupled to drive mechanism 404, drive mechanism 404 may be utilized with a plurality of differently configured wall support holders 402 configured to support a plurality of different wall supports. For example, one wall support 402 may be configured to support a single wall support, such as a single hook and impeller combination, while another wall support 402 may be configured to hold a plurality of wall supports to simultaneously support a plurality of wall supports such as when heavier wall hangings must be supported along a wall. Although less desirable, wall support 402 may alternatively be integrally formed as part of a single unitary body or permanently attached or otherwise coupled to drive mechanism 404. FIGS. 11 and 12 illustrate second and third impellers without corresponding hooks to depict a possible alternative wall support arrangement in which three impellers are utilized for a single hook.

FIG. 12 best illustrates drive mechanism 404. Drive mechanism 404 is generally configured to drive or impel a wall support, such as wall support 14, into a wall, such as wall 16. In particular, drive mechanism 404 includes at least one drive surface which the drive mechanism 404 drives into engagement with the at least one wall support to attach the at least one wall support to a wall. As shown by FIG. 12, drive mechanism 404 generally includes frame, enclosure, housing or support structure 430 (transparently shown), drive unit 434, drive unit 436 and timing mechanism 438. Drive units 434 and 436 are each configured to apply force to one or more wall supports 14. In the particular embodiment shown in FIG. 12, drive units 434 and 436 are configured to sequentially apply a force to one or more wall supports 14. In alternative embodiments, drive mechanism 404 may be provided with a single drive unit or more than two drive units. In alternative embodiments, drive mechanism 404 may be provided with multiple drive units which would simultaneously apply a force to one or more wall supports. In FIG. 12, drive units 434 and 436 are illustrated as applying a force to an impeller 412 of a wall support 14 supported by holder 402. Two additional impellers transversely arranged below the main impeller 412 are pictured to simply illustrate the capability of drive units 434 and 436 to apply a force to wall supports 14 having multiple impellers. Although drive units 434 and 436 are illustrated as being vertically arranged relative to one another, drive units 434 and 436 may alternatively be arranged on opposite transverse sides of the impeller.

As best shown by FIG. 12, drive unit 434 includes support shaft 444, paddle 446 and spring 448. Support shaft 444 is rotatably coupled to housing 430 and includes an axial end portion 450 coupled to load mechanism 406 (shown and described hereafter). Paddle 446 generally comprises a structure non-rotatably coupled to shaft 444 and providing a drive surface 452 configured to engage the impeller 412 of wall support 14. In the particular embodiment illustrated, paddle 446 is keyed to shaft 444. In alternative embodiments, paddle 446 may be non-rotatably coupled to shaft 44 by other known structures. In still other alternative embodiments, paddle 446 may be integrally formed as part of a single unitary body with shaft 444. Although drive surface 452 is illustrated as being provided by paddle 446, drive surface 452 may be provided by various other shaped or configured structures.

Spring 448 generally comprises a torsion spring having end portions operably coupled to shaft 444 and housing 430. Spring 448 is configured such that rotation of drive surface 452 about axis 453 away from impeller 412 and towards a rear of housing 430 winds spring 448 so spring 448 stores energy for driving drive surface 452 into engagement with the impeller 412. Release of this energy causes paddle 446 and drive surface 442 to rotate about axis 453 from the loaded position shown in FIG. 12 to a fired position when surface 452 engages the impeller.

Drive unit 436 generally includes support shaft 454, paddle 456 and spring 458. Support shaft 454 is rotatably supported by or rotatably coupled to enclosure 430 and includes an axial end portion 460 coupled to loading mechanism 406.

Paddle 456 generally comprises a structure non-rotatably coupled to shaft 454 and providing a drive surface 462 configured to engage the same impeller 412 of wall support 14. In the particular embodiment illustrated, paddle 456 is illustrated as being keyed to shaft 454. In alternative embodiment, paddle 456 may be non-rotatably coupled to shaft 454 by other structures or fastening arrangements. In still other embodiments, paddle 456 may be integrally formed as part of a single unitary body with shaft 454.

Spring 458 generally comprises a torsion spring operably coupled to paddle 456 and a front portion of housing 430. Such operable coupling of spring 458 to paddle 456 may be provided by direct contact between spring 458 and paddle 456 or indirectly with spring 458 directly coupled to shaft 454. Spring 458 is configured such that rotation of shaft 454 about axis 463 in a direction away from the impeller 412 and towards the front of housing 430 winds spring 458 to store energy while paddle 456 is in a loaded position shown in FIG. 12. Release of the energy of spring 458 drives paddle 456 and its drive surface 462 towards the impeller.

Timing mechanism 438 controls the timing at which drive surfaces 452 and 462 engage and impel the impeller into wall 16 (shown in FIG. 2). As a result, timing mechanism 432 facilitates the sequential engagement and driving of the impeller 412 by drive units 434 and 436. Timing mechanism 438 generally includes support shaft 470, catches 472, and cams 474. Support shaft 470 rotatably supports catches 470 for rotation about axis 476. Catches 476 generally comprise structures non-rotatably coupled to shaft 470 and configured to rotate about axis 476 between a drive member engaging position (shown in FIG. 12) and a release position in which the drive member or paddle 456 is permitted to move towards and into engagement with the impeller 412. Each of catches 472 generally includes a head portion 478 and a tail portion 480. Head portions 478 and tail portions 480 are located on opposite sides of axis 476. Head portion 478 provides an engagement surface 482 configured to engage and temporarily retain paddle 456 in the loaded position or state. In the particular embodiment illustrated, engagement surface 482 in each of catches 472 generally comprises a notch which partially receives the forward edge of paddle 456. In alternative embodiments, engagement surface 482 may have other shapes and sizes depending upon the configuration of paddle 456. Head portion 478 is preferably configured so as to have a greater weight than tail portion 480 such that head portions 478 are biased by gravity towards a bottom of enclosure 430. In alternative embodiments, springs or other biasing mechanisms may be employed to achieve the same result.

Tail portions 480 generally extend proximate to cams 474 and are configured to be engaged by cams 474 upon sufficient rotation of shaft 444.

Cams 474 generally comprise structures stationarily or fixedly coupled to shaft 444 so as to rotate with shaft 444. Cams 474 are configured so as to engage tail portions 480 of catches 472 as shaft 444 rotates and just after drive surface 452 of paddle 446 has engaged and driven or impelled the impeller 412. Cams 474 are configured such that engagement with tail portions 480 results in catches 472 rotating about axis 476 with head portions 478 pivoting towards the front of enclosure 430 out of engagement with paddle 456 to release paddle 456. Upon its release, paddle 456 is driven by spring 458 towards the impeller such that driving surface 462 applies a secondary subsequent driving force to the impeller 412 to sufficiently drive the impeller into the wall.

The configuration and location of paddles 446 and 456 are chosen such that paddles 446 and 456 do not contact one another during the application and force to the impeller 412. Once the application of force has been completed, gravity biases catches 472 such that tail portions 480 extend upwardly towards the top of enclosure 430. During loading by load mechanism 106 (as will be described in greater detail hereafter) in which shafts 444 and 450 are rotated to return paddles 446 and 456 to a loaded state, paddle 456 engages and rides along an underside 484 of each of catches 472 until portions of paddle 456 are received within engagement surfaces 482 of catches 472.

Figure 23:
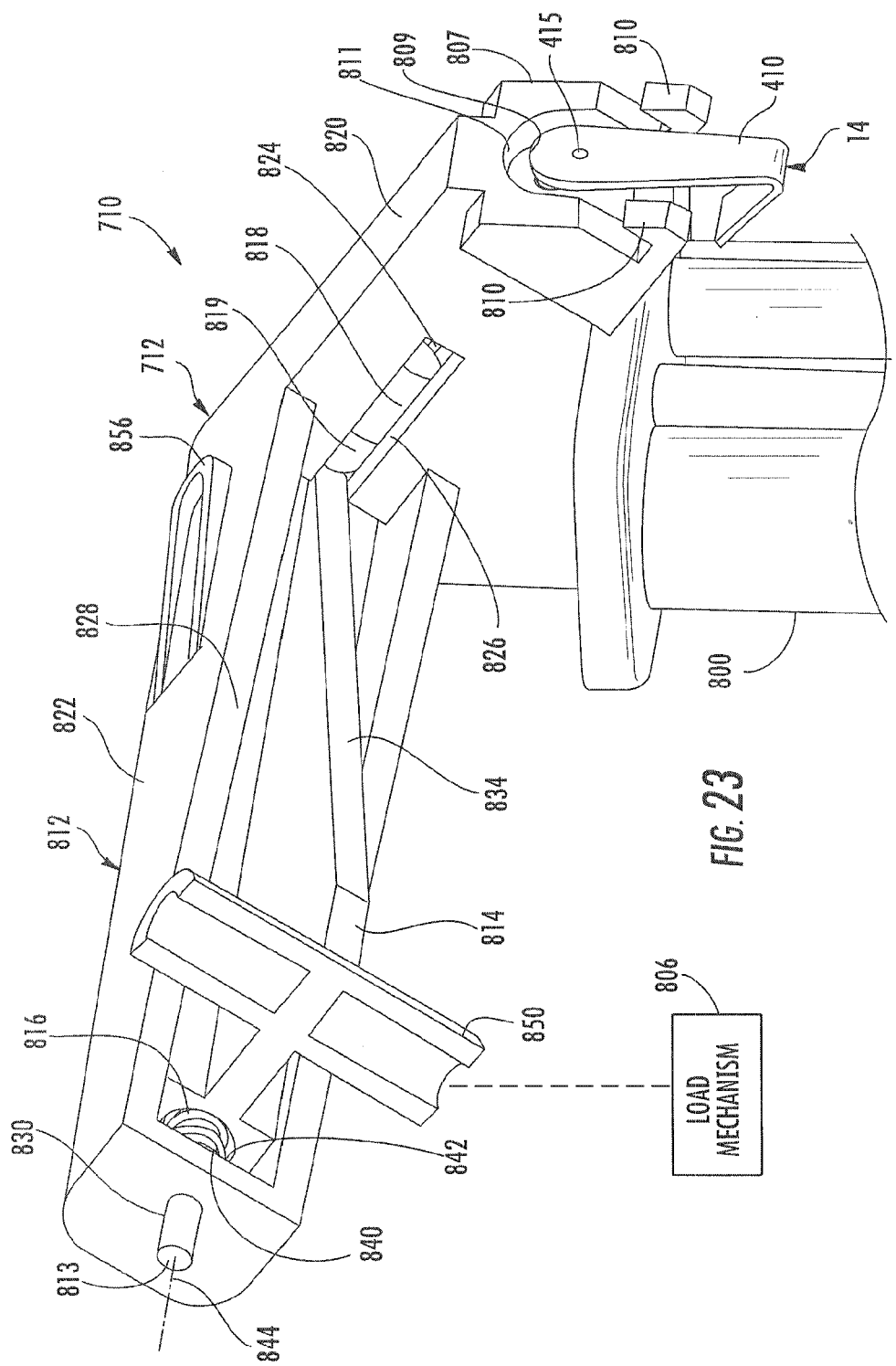
FIG. 23 is an enlarged fragmentary perspective view of the device of FIG. 21 with portions removed for purposes of illustration.

FIG. 23 illustrates but one example of a timing mechanism 438 for controlling the sequential application of force to the impeller 412 by drive surfaces 452 and 462 in sequence. Various other timing mechanisms are also contemplated. For example, in lieu of utilizing two catches 472, mechanism 438 may employ a single catch or greater than two catches. In lieu of catches 472 being nonrotatably supported by shaft 470 which is rotatably coupled to housing 430, catches 472 may be rotatably supported about shaft 470 which is fixed to enclosure 430 or may be rotatably supported about axis 476 by other structures (ears and the like) extending from enclosure 430. In lieu of catches 472 being configured to be engaged by cams 474 which are coupled to shaft 444, catches 472 may also alternatively be configured to be engaged by portions of paddle 446 or other structures which rotate with the rotation of paddle 446.

Furthermore, in lieu of the mechanical timing mechanisms shown, other more complex arrangements may be employed. For example, various electronics or control circuits may be employed to sequentially permit springs 448 and 458 to rotatably drive paddles 446 and 456 into engagement with the one or more impellers.

Figure 13:
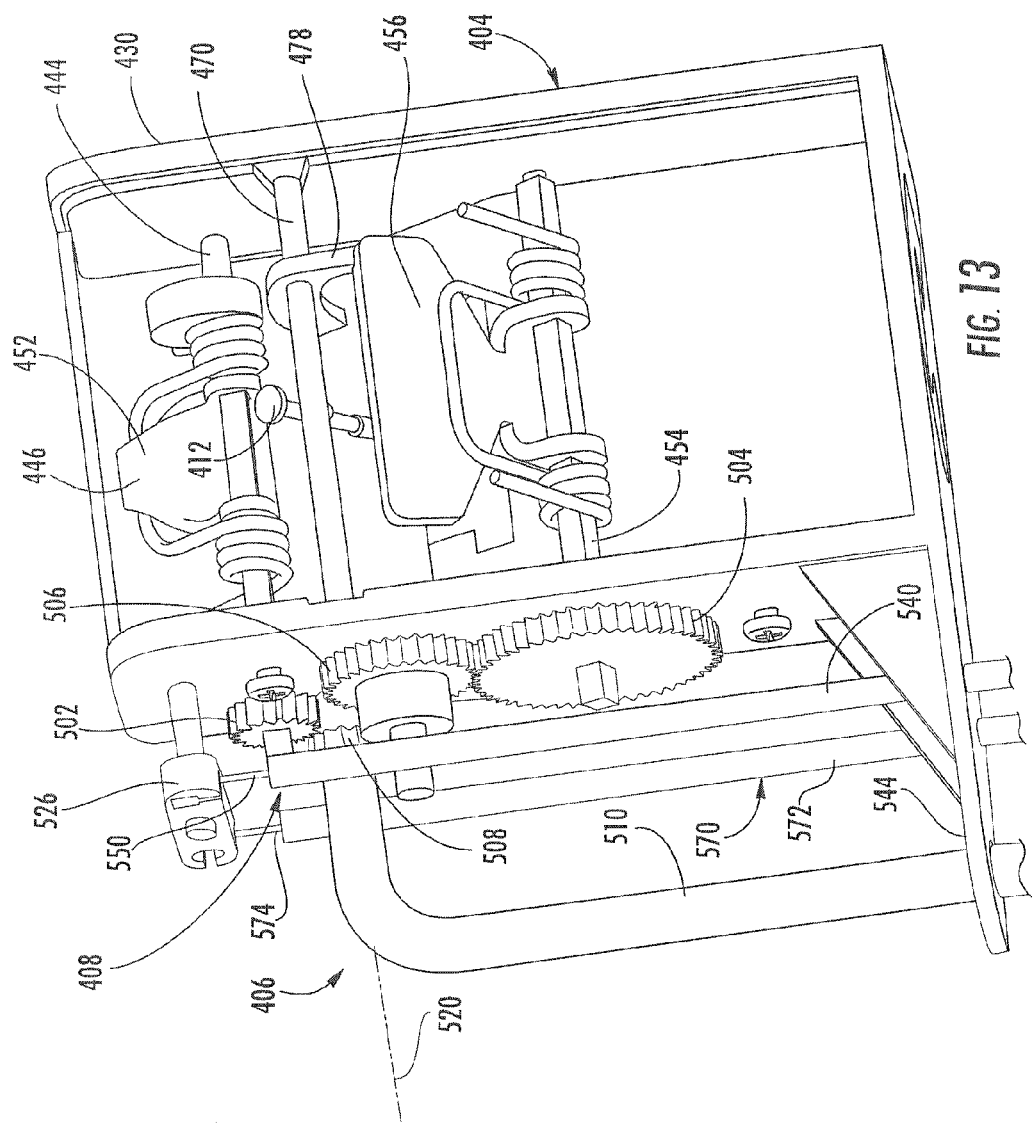
FIG. 13 is a perspective view illustrating the coupling unit of FIG. 13 including a trigger mechanism.

FIGS. 13-19 illustrate load mechanism 406 and trigger mechanism 408 in greater detail. Load mechanism 406 is generally configured to load drive units 434 and 436 by rotatably driving shafts 444 and 454 and their respective paddles 446 and 456 to the loaded position while also temporarily retaining paddles 446 and 456 in the loaded position or state until trigger mechanism 408 is actuated. As best shown by FIG. 13, load mechanism 406 generally includes gears 502, 504, 506 and 508, crank arm 510, spring 512, ratchet mechanism 514 and cover 516 (best shown in FIG. 15). Gear 502 generally comprises a pinion gear non-rotatably coupled to shaft 444. Similarly, gear 504 comprises a pinion or spur gear non-rotatably coupled to shaft 456. In the particular embodiment illustrated, each of gears 502 and 504 are keyed to the respective shafts. Gear 506 comprises a spur or pinion gear rotatably supported by one or both of enclosure 430 or cover 516 in meshing engagement with gear 504. Gear 508 comprises a pinion or spur gear fixedly coupled to crank arm 510 and configured to be simultaneously intermeshed with both gears 502 and 506. Although load mechanism is illustrated as generally employing four such gears, load mechanism 406 may alternatively employ a fewer or greater number of gears depending upon the exact configuration and material of the gears as well as the loading forces that need to be provided by loading mechanism 406. Furthermore, in lieu of employing gears, load mechanism 406 may alternatively employ chain and sprocket mechanisms, belt and pulley mechanisms or combinations thereof.

Crank arm 510 generally comprises an arm fixedly coupled to gear 508 and rotatably coupled to enclosure 430 for rotation about axis 520. Crank arm 510 is further supported for movement along axis 520 between an engaged position in which gear 508 is in meshing engagement with both gears 502 and 506 and a disengaged position (shown in FIG. 13) in which gear 508 is out of engagement with gears 502 and 506. In the engaged position, rotation of crank arm 510 about axis 520 transmits torque to gears 502 and 506. Rotation of gear 502 rotates shaft 444 against the bias of spring 448 to move paddle 446 to the loaded position shown in FIG. 12. At the same time, rotation of gear 506 rotatably drives gear 504 to rotate shaft 454 and paddle 456 against the bias of spring 458 to the loaded position shown in FIG. 12.

Spring 512 extends between an axial face of arm 510 and an opposite face of enclosure 430 to resiliently bias crank arm 510 to the disengaged position.

Figure 14:
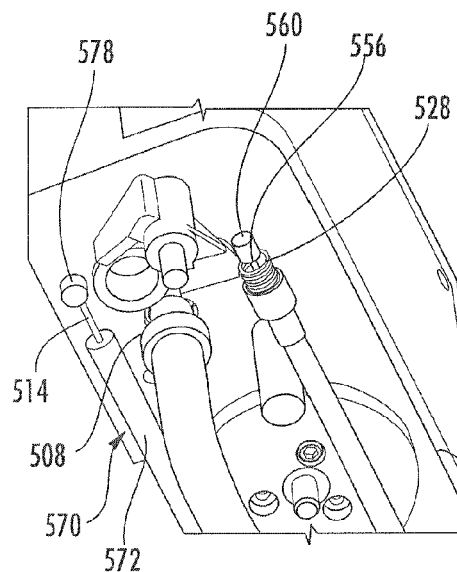
FIG. 14 is a perspective view illustrating the trigger mechanism of FIG. 13 in greater detail.
Figure 15:
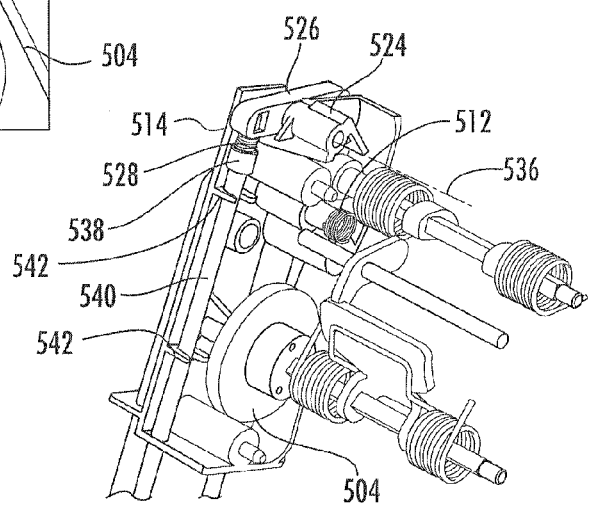
FIG. 15 is a perspective view illustrating a trigger mechanism and a drive unit of the device of FIG. 3 with portions removed for purposes of illustration.
Figure 16:
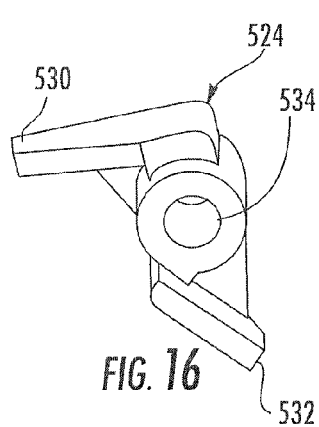
FIG. 16 and FIG. 17 are perspective views illustrating a member of the trigger mechanism of FIG. 14.
Figure 17:
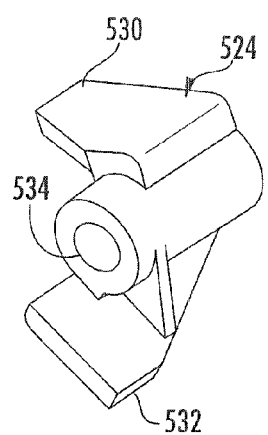

Ratchet mechanism 514 is best shown in FIGS. 14-17. For ease of illustration, FIGS. 14 and 15 omit various components such as gears 502 and 506 or illustrate some of the components in less detail such as with gears 504 and 508. As best shown by FIGS. 14 and 15, ratchet mechanism 514 includes pawl 524, pivot member 526 and spring 528. As best shown by FIGS. 16 and 17, pawl 524 generally comprises a structure including teeth 530 and 532 which are configured to be at least partially received between adjacent teeth of each of gears 502 and 506, respectively. Pawl 524 includes a bore 534, enabling pawl 524 to be fastened to pivot member 526. In alternative embodiments, pawl 524 may be integrally formed or permanently affixed to pivot member 526 by other means.

Pivot member 526 generally comprises an elongate member coupled to pawl 524 rotatably supported relative to cover 516 and/or enclosure 430 for movement about axis 536. Pivot member 526 pivots about axis 536 between a lock position in which tooth 530 engages gear 502 and in which tooth 532 engages gear 506 to prevent rotation of gears 502 and 506 and a non-loading direction, release position in which teeth 530 and 532 are sufficiently out of engagement with gears 502 and 506 to permit such gears 502 and 506 to rotate in a non-loading direction such as when paddles 446 and 456 are applying force to the impeller blank.

Spring 528 comprises a compression spring which is captured between one end of pivot member 526 and a cap 538 which is stationarily supported relative to pivot member 526 and cover 516. Spring 528 resiliently biases pivot member 526 to the lock position. As a result, as crank arm 510 is pivoted about axis 520 while in the engaged position against the bias of spring 512, gear 508 transmits torque to both gears 502 and 506 to rotate gears 502 and 506. Rotation of gears 502 and 506 causes the teeth of the gears to engage teeth 530 and 532 so as to pivot member 526 against the bias of spring 528. In short, teeth 530 and 532 of pawl 524 are ratcheted along gears 502 and 506 during loading.

As best shown by FIG. 3, cover 516 at least partially encloses gears 502, 504, 506 and 508 and pivot member 526, and further provides additional bearing surfaces for rotatably supporting the shafts to which the gears are coupled. Cover 516 also supports cap 538 as well as cable sleeves 540 which form part of trigger mechanism 408. In the particular embodiment illustrated, each cover 516 includes integrally formed slots 542 into which cable sleeve 540 is snapped into place.

Figure 18:
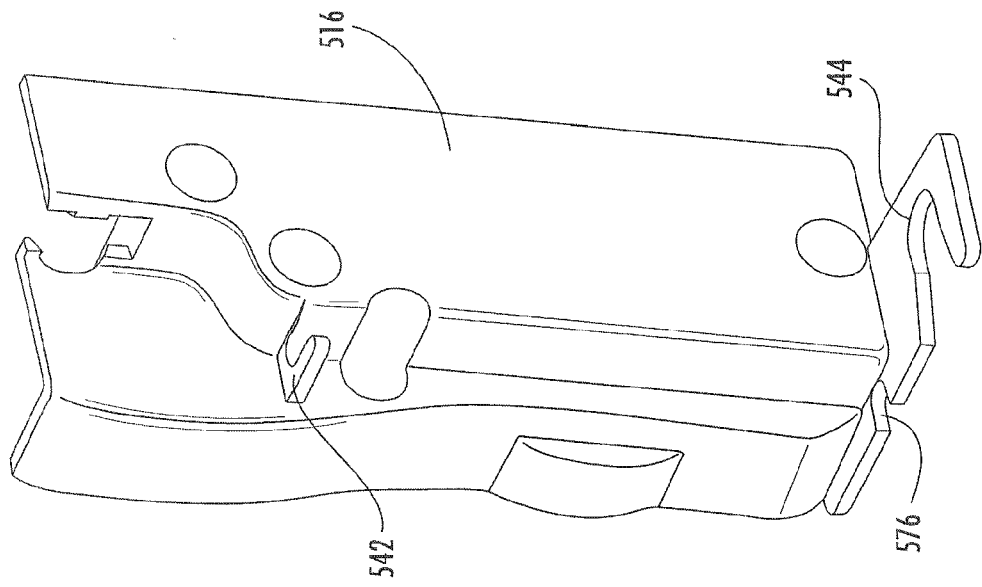
FIG. 18 is a front perspective view of a housing of the trigger mechanism of FIG. 13.
Figure 19:
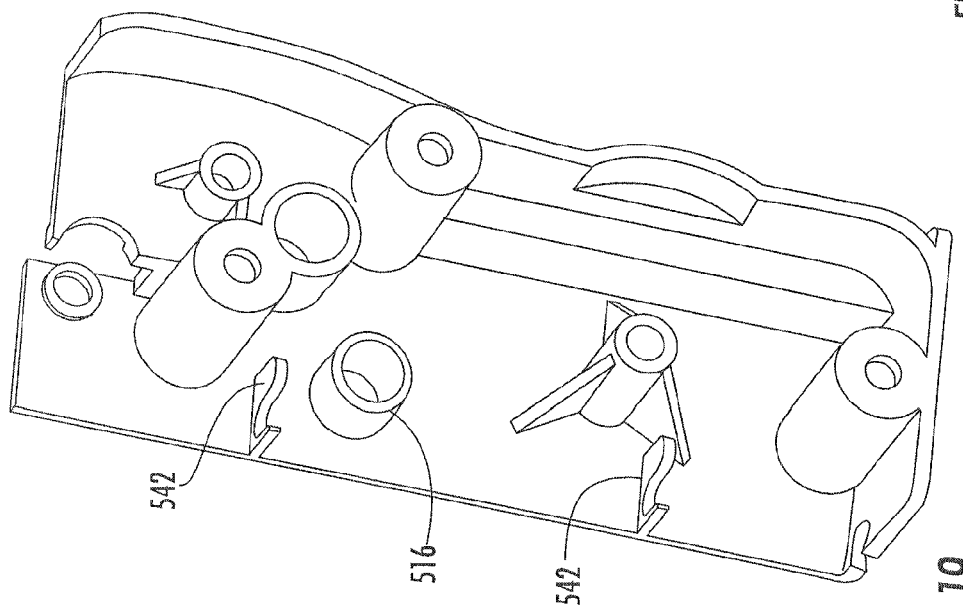
FIG. 19 is a rear perspective view of the housing of FIG. 18.

Lastly, as best shown by FIGS. 3 and 18, cover 516 provides a retainer slot 544 for receiving a portion of crank arm 510 when crank arm 510 is not being employed. Slot 544 is preferably configured to resiliently flex so that crank arm 510 may be snapped into place when not in use.

FIGS. 3 and 13-15 best illustrate trigger mechanism 408. Trigger mechanism 408 generally comprises a mechanism configured to actuate pivot member 526 from the locked position to the released position, enabling paddles 446 and 454 to move from their load positions towards the force applying positions. In the particular embodiment illustrated, trigger mechanism 406 comprises a mechanical trigger mechanism including sleeve 540, cable 550, pivot member 552 (shown in FIG. 7), trigger 554 and spring 556. Sleeve 540 generally extends from cap 538 to the interior of handle 320 where it terminates proximate to pivot member 552. Sleeve 540 guides movement of cable 550. As noted above, sleeve 540 is retained in place by means of retention slots 542 within cover 516 and further by means of retention slots 558 provided in front cover 360 of handle 320.

Cable 550 generally comprises an elongate somewhat flexible member enabling movement of the member in non-linear paths but sufficiently rigid to transmit force. An example of such a cable is a gear shifting cable in a multi-speed bicycle. Cable 550 has a first end 560 fixedly coupled to pivot member 526 and a second end (concealed) fixedly coupled to pivot member 552 (shown in FIG. 7). In the particular embodiment illustrated, end 560 includes a head which is captured within a corresponding slot or opening within pivot member 526.

Referring to FIG. 7, pivot member 552 comprises an elongate member pivotally supported by cover 360 of handle 320 for rotation about axis 562. Pivot member 552 has a first end portion 564 coupled to cable 550 and a second end portion 566 coupled to trigger 554.

Trigger 554 generally comprises a push button mechanism which is slidably supported within a recess within cover 360 and coupled to portion 566. Depressment of trigger 554 pivots pivot member 552 about axis 562 to lift portion 564 so as to pull upon cable 550. Such movement of cable 550 results in pivot member 526 being pivoted about axis 536 to compress spring 528 and to pivot teeth 530 and 532 of pawl 524 to the released position. As a result, both shafts 534 and 554 are permitted to rotate about axes 553 and 563, respectively. Initially, spring 448 will unwind, driving drive surface 452 of paddle 446 into engagement with the impeller. Drive surface 452 will engage the head of the impeller to drive the impeller downward and will then pass the head of the impeller. After paddle 446 has rotated or pivoted past the head of the impeller, cams 474 will engage and pivot catches 472 to release paddle 456. As a result, spring 458 will subsequently drive paddle 456 into the head of the impeller to further drive the impeller into wall 16. After paddle 456 has sufficiently driven the head of the impeller, paddle 456 will also rotate past the head of the impeller.

Spring 556 generally comprises a torsion spring supported by front cover 360 and in engagement with pivot member 552. Spring 556 resiliently biases pivot member 552 and associated trigger 554 towards an unactuated state in which cable 550 is not pulled and in which spring 528 is permitted to resiliently bias pivot member 526 and pawl 524 to the locked state. Upon release of trigger 554, spring 556 returns trigger 554 and pivot member 552 to the unactuated state.

FIGS. 3, 14 and 15 illustrate an optional secondary trigger mechanism 570 including a sleeve 572 and a cable 574. Trigger mechanism 570 may be used when device 310 includes a second coupling unit 312' (not shown, but identical to unit 312 except as described hereafter) similar to coupling unit 312 and also supported by arm 316. Such a need may arise wherein the wall hanging being mounted requires more than one wall support 14. In such an embodiment, trigger mechanism 570 actuates the second coupling unit as the result of depressment of the same trigger 554. For ease of explanation, the second coupling unit 312' is substantially identical to coupling unit 312 in all respects except that the second coupling unit employs trigger mechanism 570 in lieu of trigger mechanism 406. Those elements of the second coupling unit 312' which are identical to corresponding elements of unit 312 are labeled with a prime designation.

Sleeve 572 is substantially identical to sleeve 540 except that sleeve 572 extends from an opposite end of pivot member 526 (shown in FIG. 15) substantially to an end of a pivot member 526' in the second coupling unit 312'. Sleeve 570 is at least partially retained in place by retention slots 576 (shown in FIG. 18) and by retention slots 542' in the cover 516' of the second coupling unit 312'. Sleeve 570 guides movement of cable 574. Cable 574 has a first end portion 578 coupled to pivot member 526 on an end opposite to that of cable 550 and a second end coupled to one end of pivot member 526' of the second coupling unit 312'.

In the embodiment in which device 310 includes two coupling members 312 and 312', depressment of trigger 554 (shown in FIG. 7) results in cable 550 being pulled to trigger or actuate movement of paddles 546 and 556 of drive mechanism 404. Pulling of cable 550 further results in pivot member 526 pivoting about axis 536 to pull upon cable 574. The pulling of cable 574 results in pivot member 526' of the second coupling unit 312' being pivoted about its axis to the released position or state, triggering the movement or application of force by paddles 446' and 456' of the second drive mechanism 404'. In this manner, device 310 may be modified to add as many coupling units 312 as desired to impel the plurality of impellers and wall supports by simply depressing a single trigger 554.

The figures illustrate but a single example of the possible trigger mechanism 408 for triggering drive mechanism 404. Various other trigger mechanisms are also contemplated. For example, in lieu of employing a mechanical bicycle wire or cable arrangement, various other devices may be employed such as use of a remote control which communicates with an actuator (an electrical solenoid, hydraulically powered, pneumatically powered, etc.) by infrared, electrical wiring, radio frequency, etc. to cause the actuator to rotate or otherwise move ratchet mechanism 514 between the locked position and the released position.

Although drive mechanism 404 is illustrated as employing torsion springs 448 and 458 to drive paddles 446 and 456, respectively, various other energy storing or force applying mechanisms may alternatively be employed. For example, in alternative embodiments, paddles 446 and 456 could be driven with coil springs, AC or DC electric solenoids, carbon dioxide or other gas driven force applying arrangements, magnets, physical levers, electric motors, hydraulic motors and the like. Such members may serve as rotary actuators for rotatably driving shafts 444 and 454 or for rotatably driving paddles 446 and 456.

Leveler 314 generally comprises a conventionally known bubble leveling device supported by handle 320. Leveler 314 is configured to indicate to the person hanging wall hanging 20 whether or not the wall hanging is supported in a horizontal orientation. As a result, to hang a wall hanging 20, a person simply needs (1) to position wall support 14 upon holder 402, while mounting portion 18 is supported by hook portion 410, (2) to slide handles 318 and 320 to stabilize the wall hanging 20, (3) to position the wall hanging 20 in a desired position along wall 16 using handles 318 and 320, (4) to check leveler 314 to be sure that the wall hanging is in a level orientation and (5) to depress trigger 554 to drive the impeller 412 into the wall 16. Thereafter, handles 318 and 320 may be slid away from the wall hanging 20 and device 310 may simply be lowered from behind the hung wall hanging 20.

The aforementioned procedure presumes that drive mechanism 404 has already been loaded. To load drive mechanism 404, the person simply needs to inwardly depress crank arm 510 along axis 520 (shown in FIG. 13) to the engaged position, rotate crank 510 about axis 520 against the bias of springs 448 and 458, and to pull crank arm 510 outward along axis 520 and return crank arm 510 to its resting place within retention slot 544. As discussed above, ratchet mechanism 514 retains drive mechanism 404 in a loaded or cocked state once crank arm 510 is withdrawn to the disengaged position.

Figure 20:
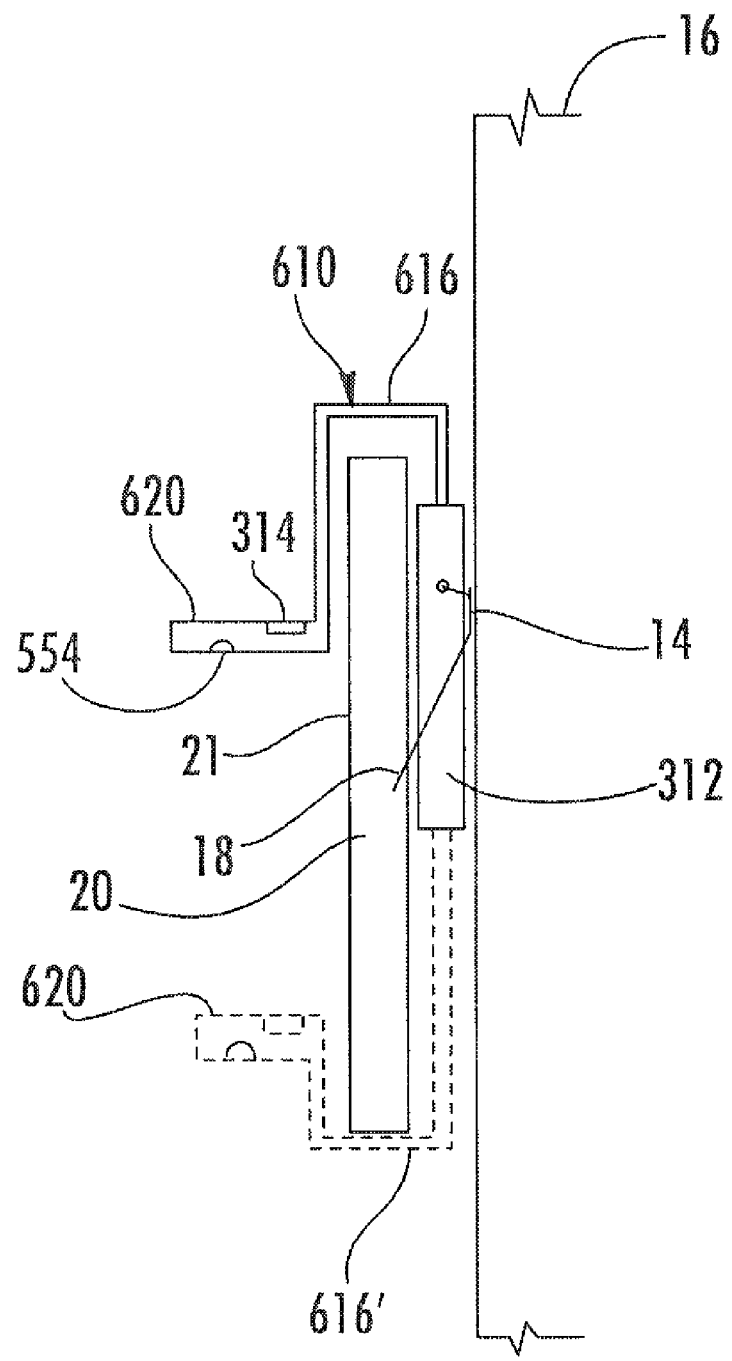
FIG. 20 is a side elevational view schematically illustrating a fourth embodiment of a wall hanging mounting device of FIG. 1.

Although device 310 is illustrated as employing arm 316 and handles 318, 320 to support coupling unit 312 which in turn supports wall hanging 20 which is in front of coupling unit 312, various other supporting arrangements 311 may be utilized to support coupling unit 312 while coupling unit 312 is positioned behind wall hanging 20. For example, FIG. 20 is a schematic illustration depicting a side of a wall hanging mounting device 610, an alternative embodiment of wall hanging device 310. Wall hanging device 610 is similar to wall hanging device 310 except that wall hanging device 610 includes arm 616 and handle 620 in lieu of arm 316 and handle 320. Device 610 omits handle 318. For ease of discussion, those remaining components of device 610 which correspond to components of device 310 are numbered similarly. Arm 616 extends between coupling unit 312 and handle 620. Arm 616 generally extends from behind wall hanging 20 up and over a top end of wall hanging 20 to a position in front of wall hanging 20. In the particular embodiment illustrated, arm 16 is an inverted U or inverted J.

Handle 620 extends from arm 616 in front of wall hanging 20 and generally in front of or within the perimeter of the wall hanging 20. In the particular embodiment illustrated, handle 620 extends nonparallel to the front plane 21 of wall hanging 20. As with handle 320, handle 620 includes a trigger 554 and a leveler 314 which functions similar to that described with respect to device 310.

FIG. 20 further illustrates an alternative arm and handle arrangement in which device 610 includes arm 616' (shown with broken lines). Arm 616' is substantially identical to arm 616 except that arm 616' is coupled to coupling unit 312 and extends from coupling unit 312 behind wall hanging 20 below a lower perimeter of wall hanging 20 and around to a front of wall hanging 20. In one embodiment, portions of arm 616' may be configured to at least temporarily support and/or stabilize wall hanging 20. In other embodiments, arm 616' may simply extend below wall hanging 20 without engaging wall hanging 20.

Wall hanging mounting devices 310 and 610 both enable a wall hanging 20 to be mounted to a wall 16 while the wall hanging 20 is positioned along wall 16 in substantially its final hung position. The attachment of wall hanging 20 to wall 16 while wall hanging 20 is positioned in substantially its final hanging position is accomplished without the need for additional tools such as hammers and the like. In contrast, the person simply actuates a trigger which initiates securement of the wall support 14 to wall 16. In addition, devices 310 and 610 further eliminate the need to have to utilize a separate leveler tool during the mounting operation. Consequently, a wall hanging 20 may be mounted by a single individual in a simple and easy fashion.

In the embodiment illustrated, coupling unit 312 has a thickness of approximately 2 inches or less. In the particular embodiment illustrated, the rearward most surface of coupling unit 312 is generally the rear of enclosure 430 or the rear of holder 402. The forward or front most surface is the front surface of the front wall of enclosure 430. The distance between these two surfaces is 2 inches or less. As a result, coupling unit 312 may be positioned between wall 16 and wall hanging 20. In particular, coupling unit 312 may be positioned between mounting portion 18 and the rear surface of wall hanging 20. In most applications, mounting portion 18 comprises a wire, wherein the wire extends about mounting portion 312 (in a fashion similar to that shown in FIG. 20 hereafter).

Figure 21:
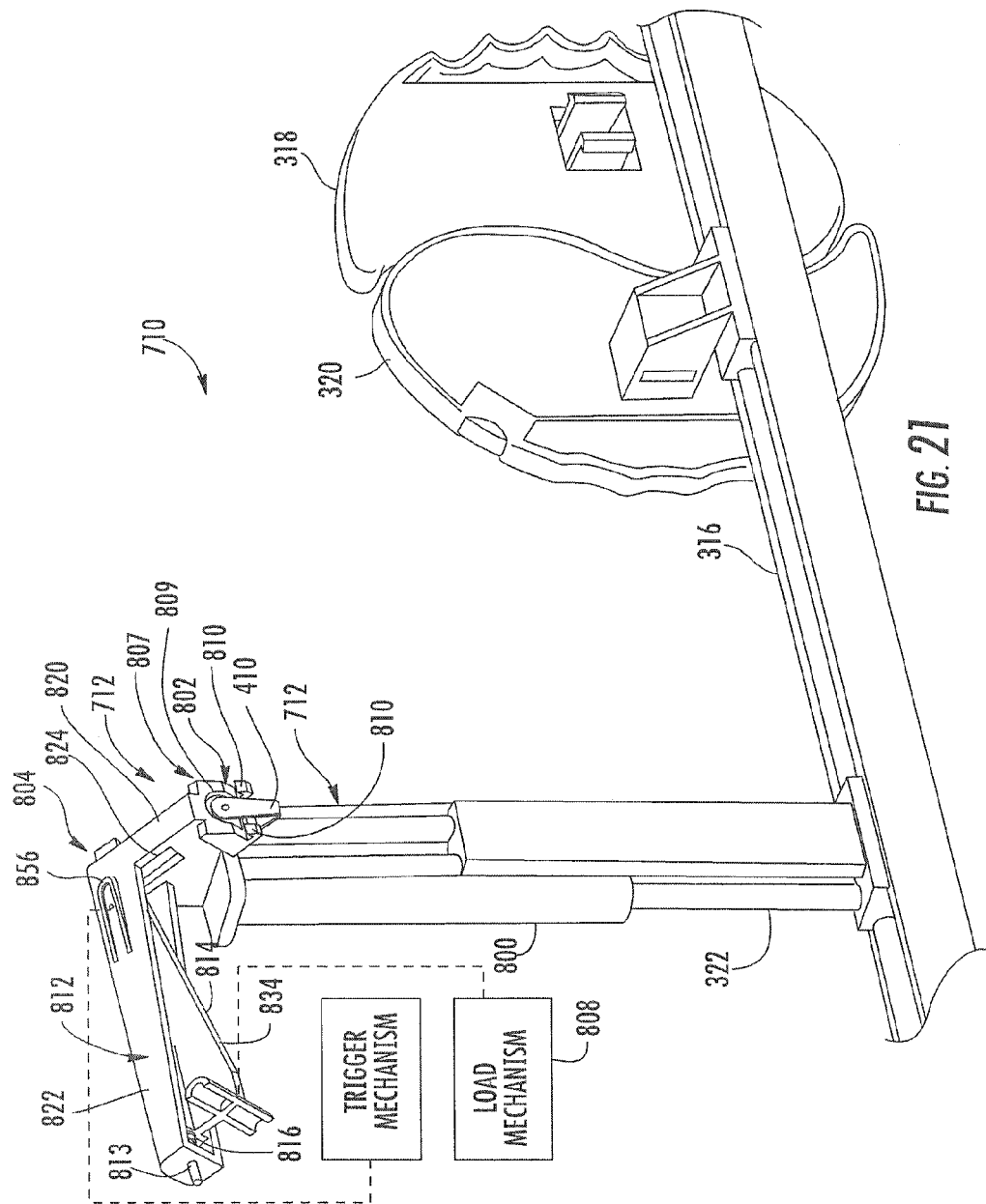
FIG. 21 is a perspective view illustrating a fifth embodiment of the wall hanging mounting device of FIG. 1 with portions schematically shown for ease of illustration.
Figure 22:
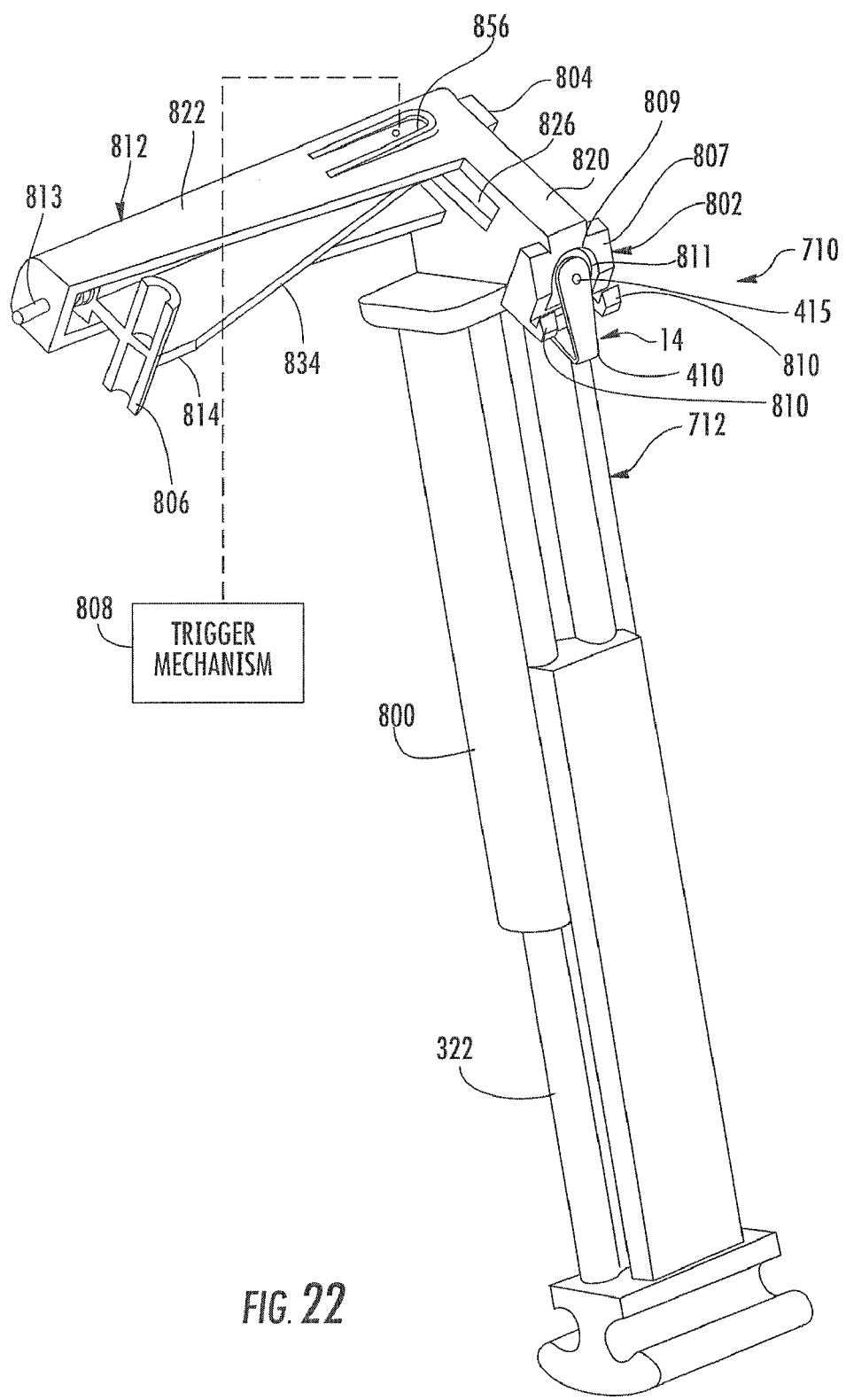
FIG. 22 is an enlarged perspective view of the device of FIG. 21 with portions removed for purposes of illustration.

FIGS. 21-23 illustrate wall hanging mounting device 710, a second alternative embodiment of wall hanging mounting device 310. Wall hanging mounting device 710 is substantially identical to wall hanging mounting device 310 except that wall hanging mounting device 710 employs coupling unit 712 in lieu of coupling unit 312. Those remaining components (which at times are only partially shown) of device 310 which correspond to those of device 310 and are numbered similarly. Please note that although handles 318 and 320 are illustrated as being adjacent to one another in FIG. 21, handles 318 and 320 would normally be positioned on opposite sides of coupling unit 712. Coupling unit 712 generally includes arm coupling portion 800, wall support holder 802, drive mechanism 804, load mechanism 806 and trigger mechanism 808 (schematically shown). Arm coupling portion 800 generally comprises a structure configured to support the remaining components of coupling unit 712 upon post 322. Like arm coupling portion 400, arm coupling portion 800 comprises an elongate tube slidably receiving post 322 to enable coupling unit 712 to slide vertically along post 322 to adjust the height of coupling unit 312 relative to arm 316 to accommodate different sized wall hangings 20.

In one particular embodiment, post 322 is provided with a plurality of vertically spaced detents while coupling portion 800 is provided with a spring-biased detent-engaging member which is resiliently biased towards the detents and which is manually actuatable away from the detents. In one embodiment, a resiliently biased polymeric flap having a protuberance or tooth is integrally formed as part of coupling portion 800 and which is located so as to project into one of a plurality of corresponding notches or cutouts formed vertically along post 322. In this manner, the positioning of coupling portion 800 relative to post 322 may be adjusted.

In alternative embodiments, various other means may be employed to movably support and releasably retain coupling portion 800 relative to post 322. For example, in lieu of utilizing integrally formed resilient material, independent springs may be employed such as leaf springs, coil springs and the like to resiliently bias the detent-engaging member. In alternative embodiments, coupling portion 800 may be provided with a detent while post 322 is provided with a plurality of vertically spaced detents while post 322 is provided with one or more resiliently biased detent-engaging members. In lieu of coupling portion 800 telescopically receiving post 322, this arrangement may be reversed. In addition, coupling portion 800 of post 322 may alternatively be configured to only partially receive or partially project into a portion of the other of coupling portion 800 and post 322. Although less desirable, coupling portion 800 may alternatively be configured to permanently secure coupling unit 712 to post 322 or to require the use of fasteners and tools for such coupling of the two members.

In lieu of being telescopically adjustable relative to one another, coupling portion 800 and post 322 may alternatively be configured to permit the intermediate attachment or coupling of one or more additional sections or segments to vary the vertical positioning of drive mechanism 404 relative to arm 316. In this manner, a person can simply detach coupling portion 800 from post 322 and insert an intermediate extender section which is removably coupled to the lower end of coupling portion 800 and which is removably or separately attached to the upper end of post 322.

Wall support holder 802 generally comprises a structure (a single member or multiple members coupled to one another) configured to hold or temporarily retain a wall support 14 in place as drive mechanism 802 impels or otherwise couples the wall support 14 to wall 16. In the particular embodiment illustrated, holder 802 is configured to hold the wall support 14 consisting of a hook 410 and an impeller 412 generally comprising a nail. In the embodiment shown, wall support holder 802 generally includes body 807 and gripping portion 809. Body 807 comprises a structure coupled to nose portion 820 of drive mechanism 804 which forms a recess 811 configured to extend about and receive an upper portion of hook 410. Although body 807 is illustrated as being integrally formed as part of a single unitary body with nose portion 820, body 807 may alternatively be configured to be releasably or separably coupled to nose portion 820 or configured to be permanently fastened, mounted or otherwise affixed to nose portion 820.

Gripping portion 809 generally comprises a band or layer of resilient or resiliently compressible material or materials coupled to body 807 and configured to surround an upper portion of hook 410. In the particular embodiment illustrated, gripping portion 809 comprises a horseshoe or U-shaped band which forms a recess or cavity for receiving an upper portion of hook 410. The material or materials of gripping portion 809 outwardly compress or resiliently flex to permit the reception of hook 410 while also gripping at least the side edges of hook 410. Although gripping portion 809 is preferably located within recess 811 and body 807, in alternative embodiments, gripping portion 809 may be coupled to body 807 without the use of recess 811. Because gripping portion 809 is compressible or resiliently flexible, gripping portion 809 may accommodate differently configured hooks.

In addition to supporting hook 410, holder 802 also is configured to support mounting portion 18 (shown in FIG. 2) of a wall hanging 20 so as to also support the wall hanging. In the embodiment shown, holder 802 additionally includes one or more catches 810 which comprise hooks configured to receive mounting portion 18 (shown in FIG. 2 as a wire). In the embodiment shown, wall hanging 20 is actually hung from catches or supports 810 while hook 410 is independently supported by gripping portion 809. Once drive mechanism 804 impels the impeller into the wall through hook 410, coupling unit 712 is simply lowered, resulting in the wire extending across support 810 to be positioned within hook 410. In the particular embodiment illustrated, the vertical space in between the bottom of the hook 410 and the wire supporting surfaces of supports 810 is minimum (nominally approximately 0.25 inches). As a result, during impelling of the impeller or nail into the wall, the wall hanging 20 is positioned substantially proximate to the final hanging position of wall hanging 20 once coupling unit 712 is separated from the wall hanging.

Although coupling unit 712 is illustrated as utilizing wall support holder 802, coupling unit 712 may alternatively employ other wall support holders such as wall support holder 302. In applications where body 807 is releasably coupled to nose portion 820, different wall support holders capable of holding differently configured wall supports 14 may be interchanged as needed.

Drive unit 804 generally comprises an assembly configured to drive an impeller such as impeller 412 through an aperture 415 within hook 410. Drive unit 802 generally includes body 812, shaft 813, a slide or drive bar 814, spring 816, drive pin 818 and ball 819. Body 812 generally comprises a structure configured to guide and support the movement of drive bar 814 as well as the movement of pin 818 and ball 819. Body 812 is generally formed from a rigid polymeric material. Alternatively, body 812 may be formed from other materials or composites having sufficient strength and rigidity for the noted function. Body 812 generally includes a nose portion 820 and a drive bar supporting portion 822. Nose portion 820 is coupled to holder 802 and is further coupled to coupling portion 800. Nose portion 820 provides an interior channel 824 in which pin 818 and ball 819 slide or otherwise move. Nose portion 820 further provides an elongate slot 826 which permits the drive bar 814 to pass through and across channel 824. In the particular embodiment illustrated, channel 824 extends along an axis at least parallel to and preferably co-extensive with the longitudinal axis of the impeller or nail while the impeller or nail passes through hook 410 and at least partially into wall 816. In the particular embodiment shown, channel 824 extends about and along an axis which is approximately 45° with respect to the horizontal. In alternative embodiments, depending upon the angle in which the impeller or nail is to be driven into the wall 16, channel 824 may be modified to extend at the same general angle.

Drive bar supporting portion 822 is coupled to nose portion 820 and is configured to guide movement of drive bar 814. In the particular embodiment shown, portion 822 includes an elongate channel 828 into which slide bar 814 is at least partially received. Portion 822 further includes an aperture 830 through which shaft 813 projects. Although portion 822 and portion 820 are illustrated as being integrally formed as part of a single unitary body, portions 820 and 822 may alternatively be permanently affixed to one another or releasably or separately coupled to one another to provide drive unit 804 with modularity such that differently sized drive bars 814 may be utilized with nose portion 820 or such that different nose portions 820 accommodate different lengths of nails may be utilized with drive bar 814.

Shaft 813 generally comprises an elongate member fixedly coupled to supporting portion 822 of body 812 and extending along and within channel 828. Shaft 813 supports spring 816 within drive bar 814 while guiding movement of drive bar 814.

Drive bar 814 generally comprises a structure configured to drive ball 819 and pin 818 into engagement with impeller 412 and to further drive the impeller 412 into wall 16 (shown in FIG. 2). Drive bar 814 includes a drive surface 834 which is inclined and which engages ball 819 as bar 814 moves from a loaded position or state (shown in FIG. 23) to a fired or post driving position or state. As drive bar 814 moves from the loaded state to the post driving state (moving left to right as shown in FIG. 23), drive surface 834 engages ball 819 and applies a force to 819 as ball 819 rides up on the inclined or sloped surface of drive surface 834. This force is transmitted through ball 819 to pin 818 which in turn transmits the force to the head of the impeller 412 to drive the impeller 412 into wall 16. In the particular embodiment illustrated, drive surface 834 is inclined or sloped at angle θ of approximately 12 degrees. In alternative embodiments, an angle θ at which drive surface 834 is sloped may be increased or decreased depending on the force constant of spring 816, the size of bearing 819, the length of pin 818 driving the nail, and overall environmental constraints such as force requirements and space availability.

Spring 816 generally comprises a compression spring supported by shaft 813 and captured between face 840 of body 812 and an opposite axial face of an internal bore 842 formed in drive bar 814. In the loaded state, drive bar 814 compresses spring 816 against face 840. Compression of spring 816 is performed by load mechanism 806 which releasably retains drive bar 814 in the loaded position. As will be described in greater detail hereafter, actuation of trigger mechanism 808 releases guide bar 814 such that spring 816 drives guide bar 814 along axis 844 to move drive surface 834 against ball 819.

Ball 819 and pin 818 cooperate to transmit force from spring 816 through drive surface 834 to the head of impeller 412 which is located within channel 824. Because ball 819 is spherical, ball 819 transmits force to pin 818 regardless of the position of pin 818 relative to ball 819 or axis 844. Overall, drive bar 814, ball 819 and pin 818 enable force along axis 844 being transmitted any one of a variety of axes that are nonparallel to axis 844. This feature is particularly useful as part of drive unit 802 wherein impeller 412 is preferably driven at an angle into wall 816 and wherein movement of a force applying member, such as drive bar 814, is limited to the relatively small space between mounting portion and the rear surface of the wall hanging 20. This feature enables drive bar 814 to move in a horizontal direction while applying force to impeller 412 which also extends along an axis that is upwardly angled.

Load mechanism 806 generally comprises a mechanism configured to move drive bar 814 and its drive surface 834 from the post driving position to the loaded position against the bias of spring 816 and to temporarily retain drive bar 814 in the loaded position until trigger mechanism 808 is actuated. Load mechanism 806 (schematically shown) comprises an eccentric cam rotatably coupled to portion 822 of body 812 and further pivotally coupled to extension portion 850 of drive bar 814. The cam is configured such that rotation of the cam bears against body 812 to move drive bar 814 along axis 844 against the bias of spring 816. By utilizing an eccentric cam, load mechanism 806 provides a lever arm to provide a mechanical advantage to assist in moving drive bar 814 to the load position against the bias of spring 816.

In alternative embodiments, load mechanism 806 may comprise other structures to assist in moving drive bar 814 along axis 844 against the force of spring 816. For example, load mechanism 806 may alternatively employ hydraulic, pneumatic, or electrical linear actuators. An example of an electrical linear actuator is an electric solenoid. Although less desirable, load mechanism 806 may simply rely on extension portions 850 to provide a gripping surface by which a person may manually pull drive bar 814 to the loaded position.

As best shown by FIGS. 23-26, load mechanism 806 additionally includes one or more structures configured to temporarily retain drive bar 814 in the loaded state until trigger mechanism 808 is actuated. Load mechanism 806 additionally includes detent 854 and detent engaging member 856. As best shown by FIG. 25, detent 854 generally comprises a notch formed in an exterior surface of drive shaft 814. Detent 854 is configured to receive detent engaging member 856.

Detent engaging member 856 generally comprises a protuberance or other structure configured to be partially received within detent 854 so as to engage and retain drive bar 814 in place. Detent engaging member 856 moves between a detent engaging position in which detent engaging member 856 projects into detent 854 and a release position in which detent engaging member 856 is removed from detent 854 to permit movement of drive bar 814 relative to support portion 822. Detent engaging portion 856 is resiliently biased towards the detent engaging position. In the particular embodiment illustrated, detent engaging portion 856 includes a portion that is appropriately dimensioned and is formed from a resiliently flexible material such that portion 856 resiliently flexes between and is resiliently biased towards the engaging position. In lieu of being integrally formed as part of a single unitary body with portion 822, detent engaging member 856 may alternatively provide a separate component or member movably coupled to body 812. Moreover, in lieu of being formed and dimensioned so as to be resiliently flexible, detent engaging member 856 may alternatively be resiliently biased by a separate spring or other compressible material.

Actuation of trigger mechanism 808 enables spring 816 to slidably drive bar 814 along axis 844 so as to transmit force to impeller 412 through ball 819 and pin 818. In one particular embodiment, trigger mechanism 808 (schematically shown) is similar to trigger mechanism 308 except that in lieu of terminating proximate to pivoting member 526, the sleeve and cable terminate proximate to detent engaging member 856. In such an embodiment, the cable would be attached to detent engaging member 856. As a result, depressment of trigger 554 (shown in FIG. 7) would result in the cable being pulled so as to pull detent engaging member 856 outwardly out of detent 854 to release slide bar 814. Release of trigger 854 would result in the relaxation of the cable, allowing detent engaging member 856 to resiliently return towards its natural detent engaging position.

In alternative embodiments, trigger mechanism 808 may employ other mechanisms other than mechanical mechanisms to move detent engaging member 856 to the released position. For example, in lieu of relying upon a sleeve and cable, load mechanism 806 may alternatively employ use of a remote control which communicates with an actuator (an electrical solenoid, hydraulically powered, pneumatically powered) by infrared, electrical wiring, radio frequency, etc., to cause the actuator to move detent engaging member 856 between the engaging position and the disengaged or released position.

Although drive unit 804 is illustrated as part of wall hanging mounting device 710, drive unit 804 may alternative be employed in various other devices wherein a fastener (such as a nail, rivet, staple) or other member needs to be impelled or driven. Drive unit 804 may be particularly advantageous in applications where limited space is available for generating or transmitting the force to the fastener or other member. Examples of such other applications include parts assembly, driving rivets, and installing bolts in subassemblies having limited space.

Figure 27:
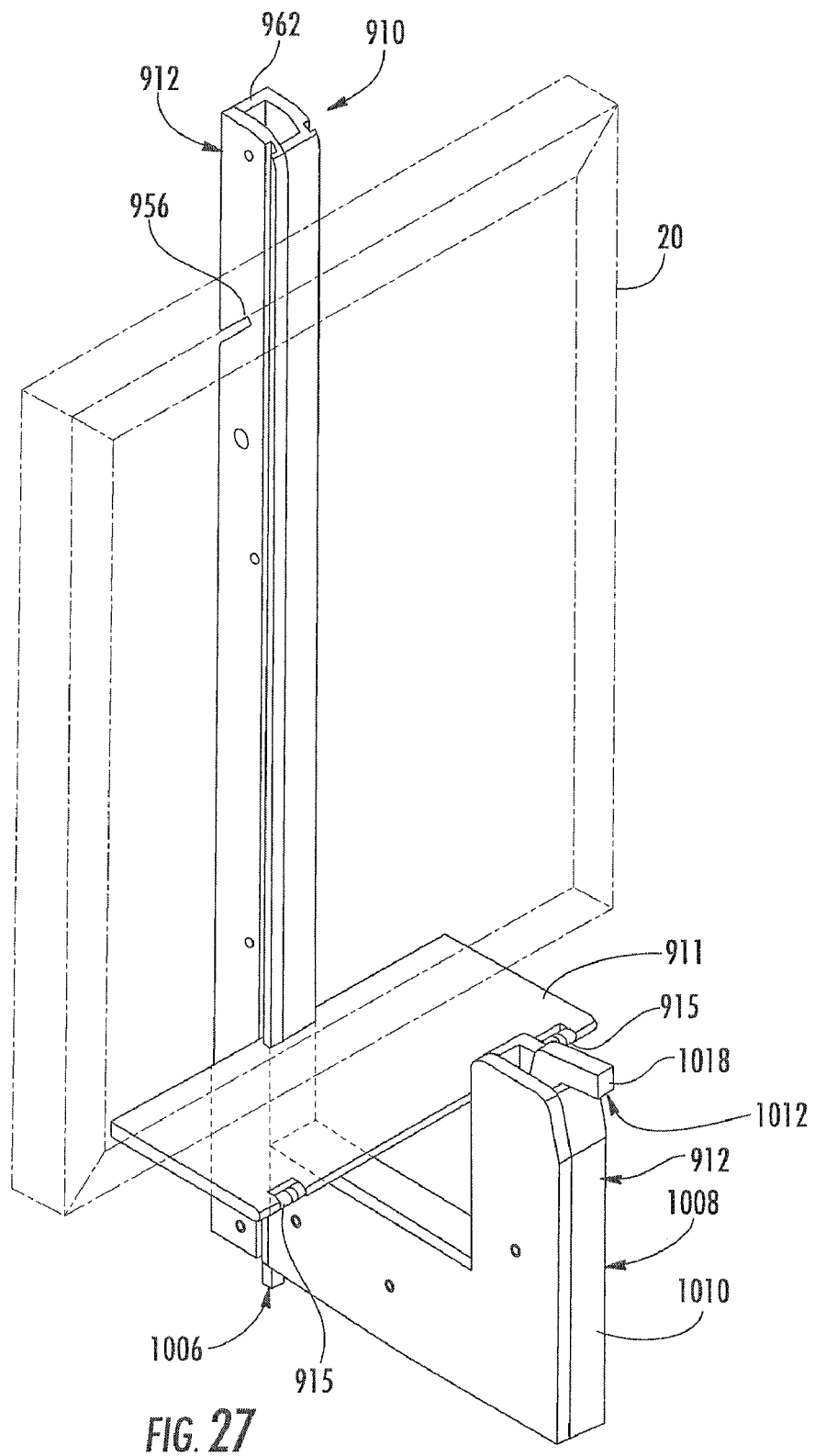
FIG. 27 is a top perspective view of a sixth embodiment of the wall hanging mounting device of FIG. 1.

FIGS. 27-36 illustrate wall hanging mounting device 910, a sixth embodiment of wall hanging mounting device 10. FIG. 27 illustrates device 910 positioned for mounting a wall hanging 920 having a mounting portion 918 (shown in FIG. 32) which comprises a wire affixed to wall hanging 20. Wall hanging mounting device 910 generally includes support platform 911, coupling unit 912 and level indicator 915. Support platform 911 comprises one or more structures coupled to coupling unit 912 and configured to extend along and engage a bottom side of wall hanging 20. Although support platform 911 is illustrated as a single planar member, support 911 may alternatively have other shapes and configurations and may include multiple members configured to engage a bottom side of wall hanging 20 at various locations.

FIG. 28 illustrates the adjustability of platform 911. As shown by FIG. 28, platform 911 includes a pair of integrally facing rails 1050 which are slidably received within corresponding outwardly facing tracks or channels 1052 formed within housing 962. Platform 911 additionally includes a retainer 1054 to releasably retain support platform 911 in a desired position along housing 962 and along channels 1052. In the particular examples shown, retainer 1054 comprises a threaded member which may be threaded into frictional engagement with a face 1056 of housing 962 to retain platform 911 in a desired position. Releasing or turning retainer 1054 in an opposite direction withdraws retainer 1054 from housing 962 to enable platform 911 to be slid along housing 962. In other embodiments, retainer 1054 may have other configurations. For example, retainer 1054 may comprise a spring-loaded member which frictionally engages face 1056 to retain housing 962 in place. In particular embodiments, face 1056 may additionally be provided with a plurality of spaced detents into which retainer 1054 may be positioned to retain platform 911 in a desired location.

Level indicators 915 comprise mechanisms configured to communicate to a user whether platform 911 and wall hanging 920 are in a level orientation. In the particular embodiment shown, level indicators 915 comprise a pair of bubble level indicators coupled to platform 911 as spaced locations. In other embodiments, level indicators 915 may be coupled to platform 911 at other locations or may be coupled to coupling unit 912. Level indicators 915 assist in insuring that wall hanging 920 is a level orientation during mounting to a wall.

Coupling unit 912 comprises a member configured to couple wall support 914 (shown in FIGS. 29-31) to a wall while wall support 915 is in at least close proximity to mounting portion 918 of wall hanging 920. In the particular embodiment shown, coupling unit 912 is configured to impel the portion of wall support 914 into a wall 16 while the wire of wall support 918 is in engagement with wall support 914. One example of wall support 914 is shown in FIGS. 29 and 30. As shown by such figures, wall support 914 is configured to hold mounting portion 918 while being affixed to wall 16 (shown in FIG. 32). In the particular example shown, wall support 914 includes a portion configured to be impelled into wall 16 by coupling unit 912. As shown by FIG. 29, wall support 914 includes impeller 922 and hanger 924. Impeller 922 comprises a fastener or other structure configured to extend into wall 16 while being coupled to hanger 924 to affix hanger 924 to wall 16. In the particular example shown, impeller 922 passes through hanger 924 and into wall 16 after being impelled into wall 16. In other embodiments, impeller 922 may alternatively extend from a single side of hanger 924, wherein coupling unit 912 applies force to portions of hanger 924 which are transmitted to impeller 922 to drive impeller 922 into wall 16.

In the particular example shown, impeller 922 comprises a fastener having a head 926 and tines or prongs 928, 930. Head 926 comprises that portion of impeller 922 configured to be struck or driven by coupling unit 912. Prongs 928, 930 have sufficiently pointed ends 932 so as to penetrate wall 16, allowing a remainder of prongs 928, 930 to be driven into wall 16. Prongs 928, 930 each have a diameter of thickness sufficiently small such that the holes formed in wall 16 by the impelling of prongs 928 and 930 are deminimus and substantially imperceptible to a human eye from about 6 inches away from the surface of wall 16. At the same time, prongs 928, 930 have a sufficient length to enable impeller 922 to cooperate with hanger 924 to support hanger 924 from amounting portion 18 and wall hanging 20 along wall 16. In the particular example shown, impeller 922 is formed from a metal, such as steel or brass. Head 926 has a length of at least 0.4 inches (nominally 0.52 inches). Prongs 928, 930 each have a diameter of no greater than 0.04 inches and a length extending from head 926 of at least 0.8 inches. Prongs 928 and 930 have a length sufficient such that at least about 0.6 inches of each of prongs 928, 930 extends into wall 16 to support hanger 924 relative to wall 16. Although prongs 928, 930 are illustrated as having substantially the same diameter as head 926, prongs 928, 930 and head 926 may have differing diameters or thicknesses. Moreover, in other embodiments, depending on the configuration of hanger 924, impeller 922 may have other shapes, sizes and configurations and may be made from other materials. For example, in another embodiment, impeller 922 may include greater than 2 tongs for increased fastening. In still other embodiments, impeller 922 may alternatively have a round flat head 926 and a single tong or pointed shaft similar to that of a nail.

Hanger 924 comprises a structure configured to be supported adjacent to wall 16 while supporting mounting portion 18. Hanger 924 includes main portion 936, lower hooks 938 and extensions 940. Main portion 936 comprises a main structure having the main surfaces which are configured to lie face against wall 16. In the particular example shown, main portion 936 has a width $w_1$ of about 1.1 inches along hooks 938, a width $w_2$ of about 0.76 inches at extensions 940 and a height h of about 0.76 inches. The surface area of main portion 936 distributes forces across wall 16, enabling hanger 924 to more stably support mounting portion 18 and wall hanging 20.

Hooks 938 extend from main portion 936 and are configured to form a channel 939 configured to receive mounting portion 18. As shown by FIG. 30, hooks 938 engage an underside of mounting portion 18 and are spaced apart from one another by a distance $d_1$ of approximately 0.6 inches. In other embodiments, hanger 924 may consist of greater than 2 hooks or fewer than 2 hooks which may be spaced apart from one another or which may continuously extend along main portion 936. Hooks 938 generally face in a common upward direction.

Main portion 936 includes an elongate slot 942 proximate to extensions 940. Slot 942 generally is an opening through which prongs 928, 930 extend. Slot 942 is configured such that edges 944 adjacent to slot 942 face and potentially engage opposite outer sides of prongs 928 and 930 passing through slot 942. Edges 944 guide movement of prongs 928, 930 through slot 942 and into wall 16. Edges 944 assist in preventing prongs 928, 930 from splaying outward, away from one another as force is being applied to head 926 during impelling of prongs 928, 930 into wall 16 (shown in FIG. 32). Because the opening in main portion 936 through which prongs 928, 930 is formed as a slot, slot 942 accommodates tolerance variations of slot 942 as well as impeller 922. At the same time, friction between main portion 936 and prongs 928, 930 is reduced to facilitate impelling of impeller 922 into wall 16. Alternatively, in other embodiments, slot 942 may be replaced with a pair of spaced openings through main portion 936.

Extensions 940 project from main portion 936 and are configured to secure impeller 922 to hanger 924. In the particular example shown, projections 940 comprise downwardly angled tabs generally opposite hooks 938 above slot 942 of main portion 936. Extensions 940 include openings 946. Openings 946 are configured to facilitate sliding movement of prongs 928, 930 therethrough, through slot 942 and into wall 16. Openings 946 guide movement of impeller 922 and assist in retaining impeller 922 relative to hanger 924. Openings 946 are configured such that extensions 940 have inner edges 948 engaging the inner sides of each of prongs 928 and 930. Edges 948 assist in preventing prongs 928, 930 from deforming inwardly towards one another. Overall, edges 944 and 948 cooperate with one another by engaging opposite sides of prongs 928 and 930 to guide movement of prongs 928 and 930.

In other embodiments, slot 942 and openings 946 may have other configurations while still guiding prongs 928 and 930. For example, in another embodiment, in lieu of comprising a completely bounded opening, slot 942 may alternatively comprise two slots inwardly extending from an outer edge of main portion 936 such that the edges of main portion 936 engage inner sides of prongs 928 and 930. In such an embodiment, openings 946 may be configured as shown or may comprise outwardly extending channels or slots extending from side edges 950 of extensions 940 such that portions of extension 940 engage inner sides of prongs 928, 930. In still other embodiments, openings 946 may alternatively comprise slots, channels or cutouts extending from outer sides 952 of extensions 940, wherein edges of extensions 940 still engage the inner sides of prongs 928, 930.

As further shown by FIG. 30, inner edges 950 of extensions 940 are spaced from one another to receive portions of coupling unit 912. In the particular example shown, edges 950 are spaced so as to frictionally engage portions of coupling unit 912 to assist in retaining wall supports 914 relative to coupling unit 912. In the example shown, edges 950 and main portion 936 wrap about three sides of mounting portion 912 to assist in retaining wall support 914 relative to coupling unit 912.

In other embodiments, extensions 940 may alternatively be configured so as to not engage coupling unit 912. In lieu of having two spaced extensions 940, hanger 924 may alternatively have a single continuous extension 940 provided with both openings 946 or other opening configurations or may include greater than two such extensions 940. For example, hanger 924 may include additional extensions 940 depending upon the number of prongs provided by impeller 922. In still other embodiments, hanger 924 may include greater than two extensions 940 to enable hanger 924 to be utilized with a multitude of differently configured and differently sized impellers 922.

FIG. 31 illustrates wall support 1114, another embodiment of wall support 914. Wall support 1114 is similar to wall support 914 except that wall support 1114 additionally includes hook 1138. Those remaining structures or components of wall support 1114 which correspond to structures of wall support 914 are numbered similarly. Hook 1138 extends from main portion 936 between hooks 938. Hook 1138 forms a downwardly facing channel facing away from the upwardly facing channel provided by hooks 938. As shown by FIG. 31, hook 1138 is configured to engage an upper side of mounting portion 18. Hook 1138 assists in maintaining mounting portion 18 within the channels of hooks 938 by reducing the potential for mounting portions 18 from rising out of the channels of hooks 938.

FIGS. 32-36 illustrate coupling unit 316 in greater detail. Coupling unit 312 comprises a device configured to impel impeller 922 into wall 16 while wall support 914 (or wall support 1114) is in at least close proximity to mounting portion 18 of wall hanging 20. Coupling unit 912 includes wall support holder 1002, drive mechanism 1004, loading mechanism 1006 and trigger mechanism 1008. Wall support holder 1002 comprises a portion of coupling unit 302 configured to temporarily and releasably retain wall support 914 in place as drive mechanism 1004 drives impeller 922 into wall 16. Wall support holder 1002 retains wall support 914 while mounting portion 18 is received within the channels of hooks 938. As shown by FIG. 34, wall support holder 1002 includes channel 956 and recess 958. Channel 956 comprises an opening extending into housing 962 of drive mechanism 404. Channel 956 is configured to receive head 926 of impeller 922. Channel 956 is angled relative to a horizontal plane to accommodate impeller 922 which is also angled relative to the horizontal plane. In the particular example shown, impeller 922 extends through hanger 924 at an angle θ of approximately 45 degrees. It has been found that this angle maximizes the retention capability of impeller 922. In other embodiments, the angle at which impeller 922 extends from hanger 924 and the angle at which channel 938 extends into housing 962 may be varied. Channel 956 engages an underside of head 926 to further guide movement of impeller 922 as impeller 922 is being driven by drive mechanism 1004. In other embodiments, channel 956 may be longer such that channel 956 does not guide or contact an underside of head 926 or an underside of prongs 928, 930.

Recess 958 comprises a cutout extending into housing 962 below channel 956. Recess 958 has a depth of at least a thickness of mounting portion 18. As a result, mounting portion 18 may be positioned within the channels provided by hooks 938 while main portion 936 extend substantially parallel to and flush with housing 962 as it is pressed against wall 16. In other embodiments, recess 958 may be omitted.

As discussed above with respect to hanger 924 in FIG. 29, housing 962 extends between extensions 940 and frictionally engages inner edges 950 of extensions 940 to further assist in retaining wall support 914 in place as impeller 922 is driven by drive mechanism 1004. In other embodiments, other mechanisms may be used to assist in retaining wall support 914 in place. For example, in one embodiment, holder 1002 may alternatively or additionally include a projection or ledge along housing 962 configured and located to engage and support a lower edge of wall support 914 in a fashion similar to as that shown in FIG. 9. In still other embodiments, holder 1002 may alternatively comprise a surface configured to grip an outer edge of wall support 914 in a fashion similar to that shown in FIG. 22.

Figure 32:
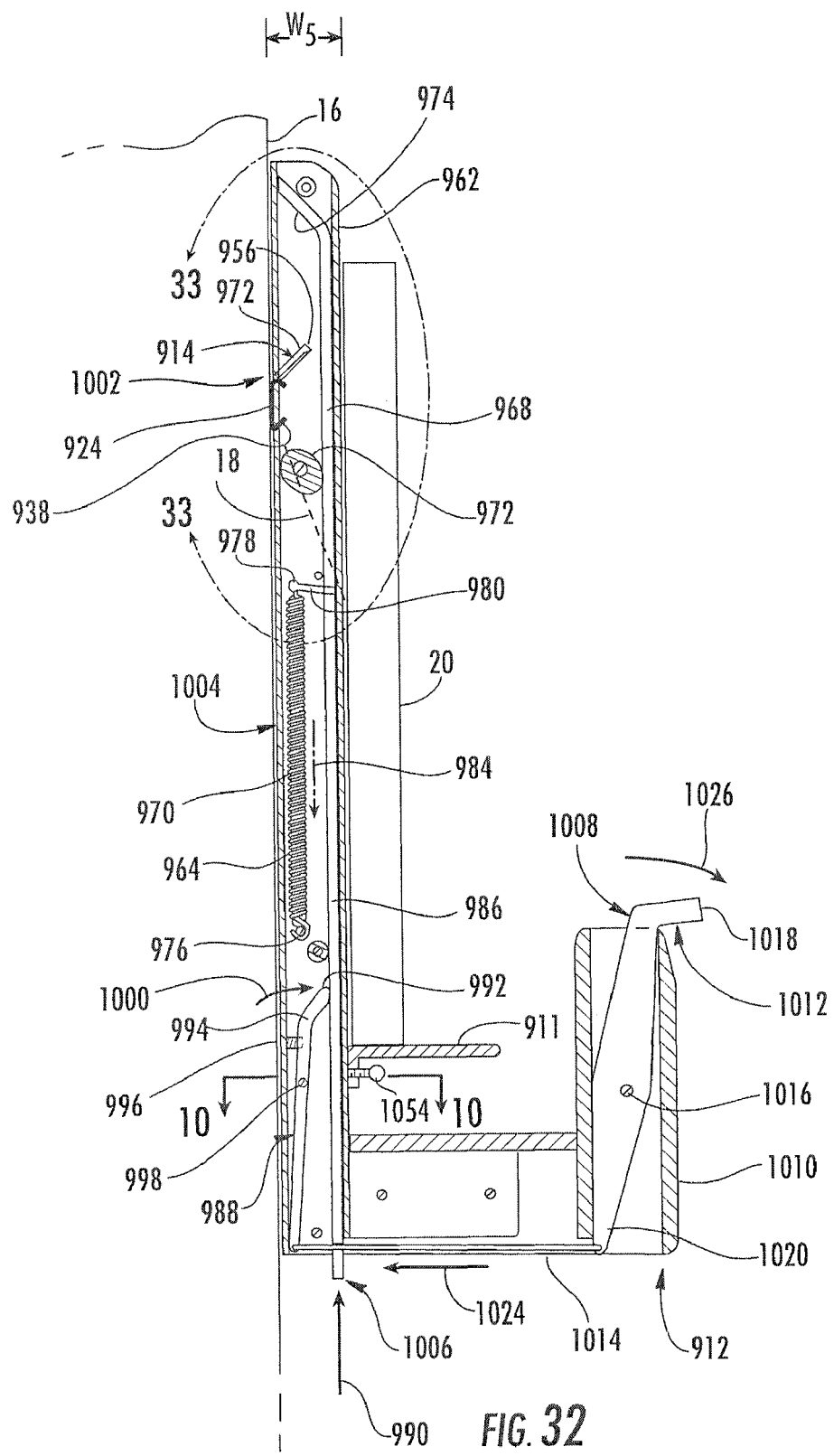
FIG. 32 is a sectional view of the device of FIG. 27 illustrating a drive surface in a loaded position.

Drive mechanism 1004 comprises a mechanism configured to drive or impel impeller 922 into wall 16. As shown by FIG. 32, drive mechanism 1004 includes frame, enclosure, support structure or housing 962 and drive unit 964. Housing 962 substantially encloses drive unit 964. Housing 962 further guides and directs movement of drive unit 964. Housing 962 has a width $W_3$ configured to extend between a back surface of wall hanging 20 and wall 16 while wall support 914 is positioned against wall 16 and while mounting portion 18 extends from wall hanging 20 into engagement with wall support 914. In the particular examples shown, housing 962 has a width $W_3$ of no greater than approximately 2 inches.

Figure 36:
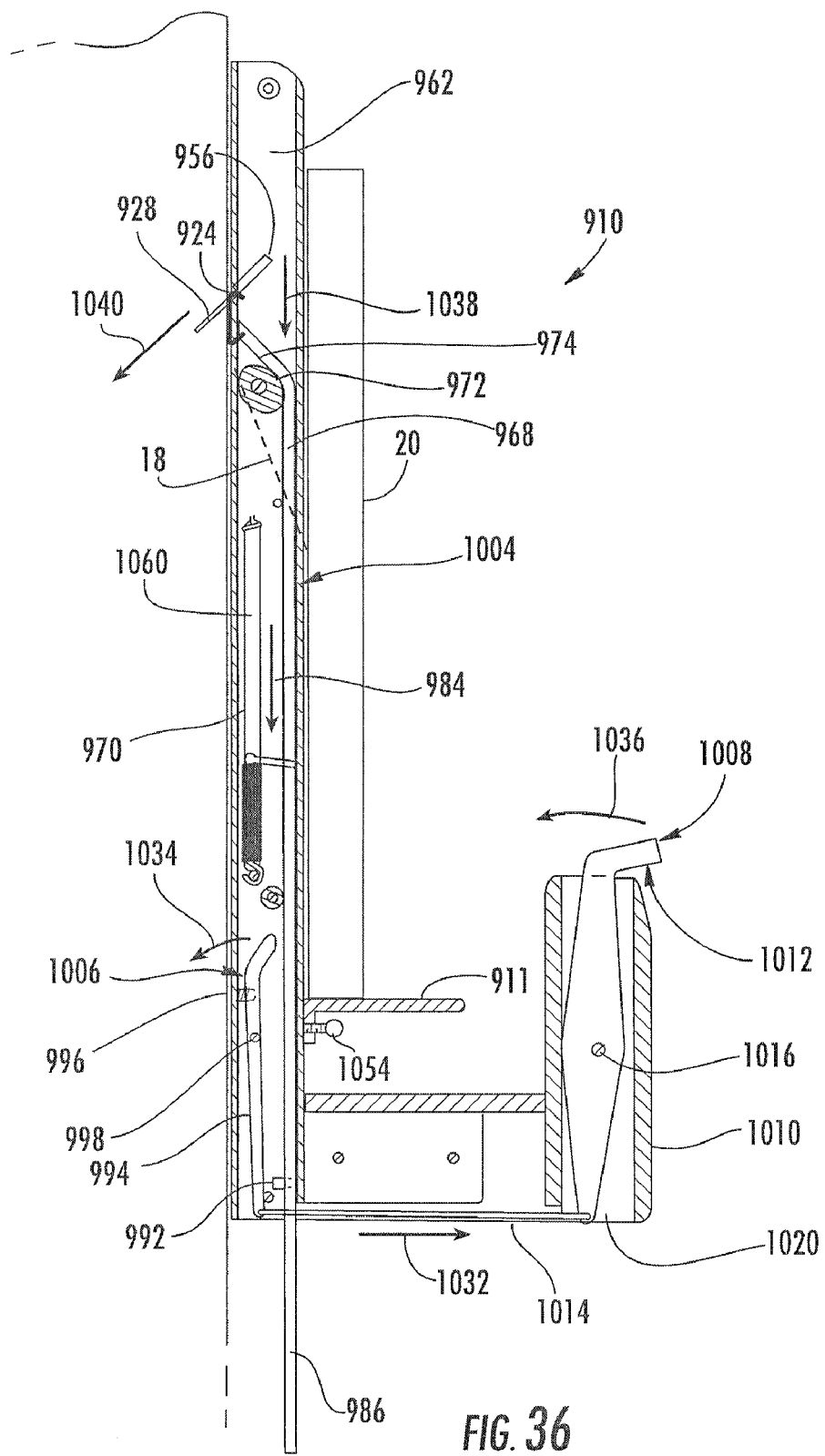
FIG. 36 is a sectional view of the device of FIG. 27 with the drive surface in a discharged position.

As best shown by FIG. 36, housing 962 includes an elongate channel which receives spring 970 of drive mechanism 1004. Channel 1060 assists in guiding the extension or retraction of spring 970.

Drive unit 964 is substantially contained within housing 962 and engages impeller 922 to drive impeller 922. Drive unit 964 includes slide or drive bar 968 and spring 970. Bar 968 extends within housing 962 and generally comprises a drive member having a drive surface 974. Drive surface 974 comprises a surface configured to engage head 926 of impeller 922 so as to exert a force upon impeller 922 to drive impeller 922 into wall 16. Drive surface 974 is generally angled with respect to a horizontal plane. In the particular example shown, drive surface 974 extends at approximately 135 degrees relative to a horizontal plane such that drive surface 974 is substantially perpendicular to the plane containing prongs 928, 930. Drive surface 974 is movable between a loaded position (shown in FIGS. 32 and 33), an impelling position (shown in FIG. 34) and a discharged position (shown in FIG. 35). Drive surface 974 moves between the loaded position, the impelling position and the discharge position in a plane substantially parallel to wall 16 and in a direction non-parallel to the direction in which impeller 922 is impelled into wall 16. Drive bar 968 does not need to project in front of wall hanging 20 which would otherwise obstruct the view of wall hanging 20 by a person hanging wall hanging 20 on wall 16. In the particular example shown, slide bar 972 is formed from a sufficiently hard material for driving impeller 922. In the embodiment shown, bar 968 is formed from steel. In other embodiments, portions of bar 968, other than drive surface 974, may be formed from less hard materials.

Spring 1004 comprises a tension spring having a first end 976 coupled to housing 962 and a second end 978 coupled to bar 968 via pin 980. During loading of bar 968, spring 1004 is extended so as to store energy for driving bar 968 and impeller 922. As will be described in greater detail hereafter, the fluctuation of trigger mechanism 1008 discharges spring 970 such that drive surface 974 is driven in the direction indicated by arrow 990 to move drive surface 974 to the impelling position and to the discharge position in which drive surface 974 engages stop 972.

Stop surface 972 comprises a surface coupled to housing 962 and configured to stop drive surface 974 after drive surface 974 has moved through the impelling position. In the particular embodiment shown, stop surface 972 is further configured to absorb energy or force from drive surface 974. In one embodiment, stop surface 974 comprises an elastomeric material such as an elastic polymer, rubber or foam coupled to housing 962 below wall support holder 1002. In other embodiments, stop surface 972 may have other configurations configured to brake drive surface 974 after drive surface 974 is driven to impeller 922.

Load mechanism 1006 comprises a mechanism configured to enable drive surface 974 to be moved to the loaded position and to be temporarily retained in the loaded position until trigger mechanism 1008 is actuated. In the particular example shown, load mechanism 1006 includes slide bar extension 986 and retaining mechanism 988. Slide bar extension 986 extends from slide bar 968 from a point below pin 980. Extension 986 extends within housing 962 and extends beyond housing 962 when drive surface 974 is in the discharged position as shown in FIG. 35. Extension 986 enables side bar 968 to be moved within housing 962 in the direction indicated by arrow 990 from a discharged position to the loaded position. In one embodiment, the lower end of extension 986 is placed against a hard flat surface while housing 962 is moved towards the hard flat surface, moving drive surface 974 to the loaded position.

Retaining mechanism 988 is configured to releasably retain drive surface 974 in the loaded position. Retaining mechanism 988 generally includes catch 992, retainer 994 and bias member 996. Catch 992 comprises a surface along extension 986 configured to be engaged by retainer 994 so as to retain drive surface 974 in the loaded position. In the particular example shown, catch 992 is formed by a pin screwed or otherwise affixed to extension 986. In other embodiments, catch 992 may be integrally formed or molded as part of extension 986.

Retainer 994 comprises an elongate arm pivotally coupled to housing 962 about axis 998. Retainer 994 pivots between a retaining or loading position (shown in FIG. 32) and a releasing or discharging position (shown in FIG. 35). In the loading position, retainer 994 engages catch 992 to retain drive surface 974 in the loaded position. In the discharging position, retainer 994 is withdrawn from catch 992, permitting spring 970 to retract to drive drive surface 974 towards stop surface 972.

Bias member 996 resiliently biases retainer 994 towards the retaining or loading position as shown in FIG. 32. In the particular example shown, bias member 996 comprises a compression spring coupled between retainer 994 and housing 962. Member 996 enables catch 992 to be moved from below retainer 994 to above retainer 994 as member 996 is compressed. Once catch 992 is above retainer 994 (as seen in FIG. 32), member 994 resiliently returns retainer 994 to the retaining position as indicated by arrow 1000.

In lieu of comprising a compression spring, bias mechanism 996 may comprise other biasing structures such as a leaf spring, tension spring, or resilient material coupled between housing 962 and retainer 994.

Trigger mechanism 1008 comprises a mechanism configured to actuate retainer 994 from the retaining or loading position to the releasing or discharging position. Trigger mechanism 1008 includes housing 1010, trigger 1012 and coupling member 1014. Housing 1010 comprises a structure coupled to housing 962 and configured to enclose or shield portions of trigger 1012 and coupling member 1014. Housing 1010 further guides movement of trigger 1012 and coupling member 1014.

Trigger 1012 comprises a member pivotally coupled to housing 1010 about axis 1016. Trigger 1012 includes actuation surface 1018 on a first side of axis 1016 and working end 1020 on a second opposite side of axis 1016. Working end 1020 is coupled to retainer 994 by coupling member 1014 which is illustrated as a wire. Because coupling member 1014 couples trigger 1012 to retainer 994, compression member 994, bias member 996 also resiliently biases trigger 1012 to an unactuated state as indicated by arrows 1024, 1026 as shown in FIG. 32.

To mount wall hanging 20 to wall 16, the following steps are performed.

Drive surface 974 is moved to the loaded position by exerting an upward force upon extension 986 in the direction indicated by arrow 990 in FIG. 32. As drive surface 974 is being moved toward the loaded position, spring 970 is extending. As catch 992 moves past retainer 994, bias member 996 is compressed. Once catch 992 passes retainer 994, bias member 996 resiliently returns retainer 994 to retaining or loading position shown in FIGS. 32 and 33. Once drive surface 974 has been moved to the loaded position, wail hanging 20 may be positioned relative to device 910.

Wall hanging 20 is positioned upon platform 911 with mounting portion 18 extending about housing 962 of coupling unit 912. Mounting portion 18 is further positioned within the channels 939 provided by hooks 938 and wall support 914 is positioned relative to housing 962 by positioning impeller 922 within channel 956 and by positioning mounting portion 18 within recess 958. Hanger 924 is positioned relative to housing 962 such that extensions 940 (shown in FIG. 30) straddle the opposite sides of housing 962. The height of platform 911 is adjusted using retainer 1054 such that wall hanging 20 is supported by platform 911 but such that mounting portion 18 is relatively taut.

Coupling unit 912, wall support 914 and wall hanging 20 are then positioned against wall 16 in a desired location. Reference may be made to level indicators 915 to ensure that wall hanging 20 is at a level orientation. Once wall hanging 20 is positioned in a desired location, actuator surface 1018 of trigger 1008 is pivoted forward about axis 1016 in the direction indicated by arrow 1030 as indicated in FIG. 36. This results in working end 1020 of trigger 1012 moving in the direction indicated by arrow 1032 and also results in retainer 974 pivoting against the bias of bias member 994 about axis 998 in the direction indicated by arrow 1034 to dislodge retainer 994 from catch 992. As a result, as shown by FIGS. 33-35, spring 970 resiliently returns to its natural state, driving slide bar 968 and drive surface 974 from the loaded position shown in FIG. 33, through the impelling position shown in FIG. 34 to the discharged position shown in FIG. 35. As shown by FIG. 34, as drive surface 974 is moving through the impelling position in the direction indicated by arrow 1038, drive surface 974 is engaging head 926 to drive tongs 928, 930 in the direction indicated by arrow 1040 into wall 16. Drive surface 974 is braked or stopped by stop surface 972. Once drive surface 974 has moved to the discharged position shown in FIG. 35, housing 962 may be moved in a direction away from wall 16 and then slid in a downward direction out from behind wall hanging 20, leaving wall hanging 20 in substantially the same position as it had assumed while being supported by platform 911 and prior to the driving of impeller 922 into wall 16.

Overall, wall hanging mounting device 910 provides several advantages as compared to the conventional techniques for mounting a wall hanging to a wall. Because device 10 couples the wall support to the wall while the wall support is at least close proximity to the mounting portion of the wall hanging itself, much of the guess work about where the wall hanging will actually be located and how it will look when hung from the wall is eliminated. In particular, the person hanging the wall hanging will know to a fairly high degree of accuracy exactly where wall hanging 20 will be located and how it will look as impeller 922 is being driven into wall 16. Level indicators 915 further assist in insuring that the wall hanging will be level when mounted to wall 16. Because platform 911 is vertically adjustable, device 10 may accommodate a variety of differently sized wall hangings 20. In particular applications where a wall hanging may require multiple wall supports, a pair of devices 910 may be used to hang a single larger wall hanging 20.

In addition, device 910 enables wall hangings 20 to be easily mounted without the need for multiple tools. Rather than having to locate a hammer and to properly strike a nail, fastener or other member with the hammer, a person simply needs to cock, load or otherwise move drive surface 974 to a loaded position and to actuate trigger 1012. A person does not need to worry about missing a target with the hammer and striking the wall hanging or subjecting the hanging to excessive vibration from a hammer strike. In contrast, device 910 provides a single one-piece mechanism which functions as a self-contained unit for mounting wall hanging 20.

FIGS. 28 and 32-36 illustrate but one example of a coupling unit 912 that may be employed for mounting wall support 914. For example, although drive unit 964 is illustrated as utilizing a tension spring 970 for driving drive surface 974 through the impelling position, drive unit 974 may alternatively comprise a compression spring coupled between drive bar 968 and housing 962 such that the spring is compressed when drive surface 974 is in the loaded position. In such an embodiment, actuation of trigger 1012 would result in the spring decompressing and firing drive surface 974. In lieu of drive surface 974 being moved to the loaded position by manually moving extension 986 upward in the direction indicated by arrow 990 in FIG. 32, drive bar 968 and drive surface 978 may alternatively be loaded utilizing other mechanisms. For example, in other embodiments, loading mechanism 1006 may omit extension 986 or other mechanisms are provided for moving or ratcheting up bar 968 to the loaded position. In still other embodiments, drive unit 964 may omit spring 970 where other means are utilized to move drive surface 974. For example, pneumatic or hydraulic firing systems utilizing or involving the release of pressurized gas or pressurized fluid against a piston or other surface to move drive surface 74 through the impelling position may be used. Electrical solenoids or other linear actuators may be utilized to move drive surface 974 through the impelling position. In some applications, electrical solenoids, linear actuators, pneumatic actuators or hydraulic actuators may be employed to extend a tension spring or compress a compression spring during loading of drive surface 974. Although trigger mechanism 1012 is illustrated as extending below wall hanging 20, trigger mechanism 1012 may alternatively extend over wall hanging 20.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A wall hanging mounting device for use with at least one wall support and a wall hanging having a mounting portion, the device comprising:
   a first coupling unit configured to couple the at least one wall support to a wall while the wall support is in at least close proximity to the mounting portion of the wall hanging, wherein the unit includes at least one drive surface that moves in a plane or about an axis contained between the wall hanging and the wall as it couples the at least one wall support to the wall, wherein the first coupling unit includes:
   a trigger configured to move between an actuated state and an unactuated state; and
   at least one drive mechanism configured to drive the at least one drive surface into engagement with the at least one wall support in response to movement of the trigger to the actuated state, wherein the at least one drive mechanism moves in a first direction nonparallel to a second direction in which the at least one wall support is impelled into the wall.

2. The device of claim 1 including at least one surface configured to retain the at least one wall support in a position relative to the mounting portion.

3. The device of claim 1, wherein the first coupling unit includes a drive unit configured to impel the at least one wall support into the wall while the wall support is in at least close proximity to the mounting portion of the wall hanging.

4. The device of claim 3, wherein the wall support includes a hook and an impelling member and wherein the at least one surface engages the hook.

5. The device of claim 1, wherein the at least one drive mechanism includes at least one spring.

6. The device of claim 1, wherein the at least one drive mechanism includes at least one linear actuator and wherein the at least one linear actuator is selected from the group including: a spring, a solenoid, hydraulic piston cylinder assembly, and a pneumatic piston cylinder assembly.

7. The device of claim 6, wherein the at least one drive mechanism includes a spring and a load mechanism configured to load the spring.

8. The device of claim 7 including a retainer configured to releasably retain the spring in a loaded condition.

9. The device of claim 1, wherein the at least one drive surface is configured to contact and drive the at least one wall support into the wall and wherein the wall coupling unit further comprises:
   a front surface;
   a recess extending into the front surface oblique to the front surface, the recess configured to receive the at least one wall support, and
   one or more guiding surfaces guiding linear movement of the at least one drive surface in a plane substantially parallel to the front surface.

10. The device of claim 9, wherein the at least one drive surface extends oblique to the front surface.

11. The device of claim 1, wherein the at least one drive mechanism includes a spring centered along an axis extending between the wall and the wall hanging as the at least one wall support is coupled to the wall.

12. The device of claim 1 wherein the wall coupling unit further comprises:
   a front surface, wherein the drive surface extends oblique to the front surface;
   a recess extending into the front surface oblique to the front surface, the recess configured to receive the at least one wall support, and
   a spring coupled to the at least one drive surface to apply force to the at least one drive surface, wherein the spring is centered along an axis parallel to the front surface.

13. The device of claim 12, wherein the spring exerts a linear force on the least one drive surface in a direction parallel to the front surface.

14. The device of claim 1 further comprising:
   a wall abutment surface configured to abut the wall and extend parallel to the wall while the first coupling unit couples the at least one wall support to the wall, the wall abutment surface including a recess of obliquely extending from the wall abutment surface and configured to receive the at least one wall support;
   wherein the drive surface is configured to contact and exert a force against the at least one wall support to couple the at least one wall support to the wall, and
   wherein the drive surface extends oblique to the wall abutment surface and linearly moves in a plane substantially parallel to the first surface and parallel to the wall when exerting a force against the at least one wall support; and
   a linear actuator coupled to the drive surface and configured to apply a linear force to the drive surface in a direction substantially parallel to the wall abutment surface, wherein the linear actuator is selected from the group including: a spring, a solenoid, hydraulic piston cylinder assembly, and a pneumatic piston cylinder assembly.

15. The device of claim 1, wherein the at least one drive mechanism moves along a first line offset from and nonparallel to a second line along which the at least one wall support is impelled into the wall.

16. The device of claim 1:
   wherein the first coupling unit includes a wall abutment surface configured to abut the wall and extend parallel to the wall while the at least one drive surface couples the at least one wall support to the wall;

wherein the drive surface is configured to contact and exert a force against the at least one wall support to couple the at least one wall support to the wall, and wherein the drive surface extends oblique to the wall abutment surface and linearly moves in a plane substantially parallel to the wall abutment surface and parallel to the wall when exerting a force against the at least one wall support and wherein the at least one drive surface moves along a first line offset from and non-parallel to a second line along which the at least one wall support is impelled into the wall.

17. The device of claim 1, wherein the first direction is different than the second direction.

18. A wall hanging mounting device for use with at least one wall support and a wall hanging having a mounting portion, the device comprising:

a first coupling unit configured to couple the at least one wall support to a wall while the wall support is in at least close proximity to the mounting portion of the wall hanging, wherein the unit includes at least one drive surface that moves in a plane or about an axis contained between the wall hanging and the wall as it couples the at least one wall support to the wall, wherein the at least one drive surface is configured to contact and drive the at least one first support into the wall and wherein the wall coupling unit further comprises:

a front surface;

a recess extending into the front surface oblique to the front surface, the recess configured to receive the at least one wall support, and one or more guiding surfaces guiding linear movement of the at least one drive surface in a plane substantially parallel to the front surface.

19. A wall hanging mounting device for use with at least one wall support and a wall hanging having a mounting portion, the device comprising:

a first coupling unit configured to couple the at least one wall support to a wall while the wall support is in at least close proximity to the mounting portion of the wall hanging, wherein the unit includes at least one drive surface that moves in a plane or about an axis contained between the wall hanging and the wall as it couples the at least one wall support to the wall, wherein the first coupling unit includes:

a trigger configured to move between an actuated state and an unactuated state; and at least one drive mechanism configured to drive the at least one drive surface into engagement with the at least one wall support in response to movement of the trigger to the actuated state, wherein the at least one drive mechanism includes a spring centered along an axis extending between the wall and the wall hanging as the at least one wall support is coupled to the wall.

* * * * *